United States Patent [19]
Yamamoto

[11] Patent Number: 5,982,398
[45] Date of Patent: Nov. 9, 1999

[54] IMAGE PROCESSING DEVICE

[75] Inventor: Hitoshi Yamamoto, Hyogo, Japan

[73] Assignee: Ricoh Company Ltd., Japan

[21] Appl. No.: 08/991,414

[22] Filed: Dec. 16, 1997

[30] Foreign Application Priority Data

Dec. 18, 1996 [JP] Japan ................................. 8-337987

[51] Int. Cl.⁶ .................................................. G06F 13/16
[52] U.S. Cl. ........................ 345/521; 345/509; 345/515; 345/517; 345/422
[58] Field of Search ........................... 345/521, 507–509, 345/515–517, 513, 422

[56] References Cited

U.S. PATENT DOCUMENTS

| | | | |
|---|---|---|---|
| 5,036,475 | 7/1991 | Ueda | 345/515 |
| 5,459,834 | 10/1995 | Katayama | 345/507 |
| 5,459,842 | 10/1995 | Begun et al. | 711/155 |
| 5,585,863 | 12/1996 | Hackett et al. | 345/203 |
| 5,828,378 | 10/1998 | Shiraishi | 345/422 |

*Primary Examiner*—Kee M. Tung
*Assistant Examiner*—Sy D. Luu
*Attorney, Agent, or Firm*—Knoble & Yoshida LLC

[57] ABSTRACT

An image processing apparatus performs one of reading and writing of pixel data for a predetermined number of pixels at one access to a frame buffer which stores the pixel data, the frame buffer comprising a memory to which access in a page mode can be performed. A pixel buffer portion comprises a plurality of stages of pixel buffers, each thereof storing the pixel data for the predetermined number of pixels. A memory interface determines the number of pixel data which is processed successively, based on the pixel data stored in each stage of the pixel buffer, and, in accordance with the determined number of pixel data, determines the number of times of CAS, which is the number of accesses which are performed successively for the same row address in one page mode operation when data is written in the frame buffer.

8 Claims, 27 Drawing Sheets

FIG. 7
| | 14 | | | 0 |
|---|---|---|---|---|
| COLOR-DATA (PD) | B | G | R | |
| | 15 | 0 |
|---|---|---|
| Z-VALUE-DATA (ZD) | Z-VALUE | |
| | 18 | 0 |
|---|---|---|
| COLOR-DATA ADDRESS (PA) | ADDRESS VALUE | |
| | 18 | 0 |
|---|---|---|
| Z-VALUE-DATA ADDRESS (ZA) | ADDRESS VALUE | |
POLYGON FLAG (PF) $[P]$ (bit 0)
POLYGON-TYPE FLAG (FD) $[\alpha \, Z]$ (bits 1, 0)
R : RED-COLOR DATA
G : GREEN-COLOR DATA
B : BLUE-COLOR DATA
P : POLYGON DATA         YES/NO
α : ALPHA BLENDING       ON/OFF
Z : Z BUFFER             ON/OFF
FIG. 8A
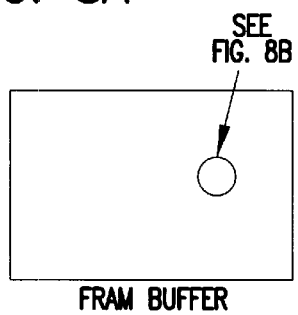
FRAM BUFFER
FIG. 8B
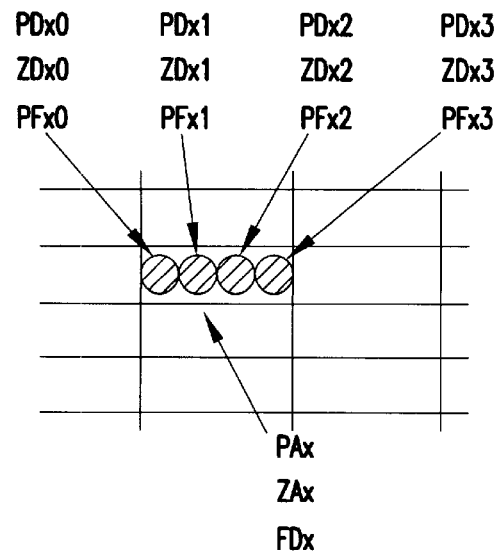
PDx0  PDx1  PDx2  PDx3
ZDx0  ZDx1  ZDx2  ZDx3
PFx0  PFx1  PFx2  PFx3
PAx
ZAx
FDx

| POLYGON TYPE | ACCESS TYPE |
|---|---|
| Z-SORTING METHOD | TYPE2 |
| Z-SORTING METHOD + ALPHA BLENDING | TYPE1 |
| Z-BAFFER METHOD | TYPE0 + TYPE2 |
| Z-BAFFER METHOD + ALPHA BLENDING | TYPE0 + TYPE1 |

IMAGE PROCESSING DEVICE

BACKGROUND OF THE INVENTION

1. Field of the Invention

The present invention relates to an image processing device in which a DRAM is used as a frame buffer.

2. Description of the Related Art

FIG. 1 shows a block diagram of an image processing device in the related art. As shown in the figure, the image processing device 91 is connected to a frame buffer 93 which is formed of a DRAM (Dynamic RAM). The image processing device 91 includes an internal pixel calculating circuit 95, a pixel buffer 97 and a DRAM interface 99. The internal pixel calculating circuit 95 calculates pixel information from input data. The pixel buffer 97 cancels a difference in operation speeds between the frame buffer 93 and the internal pixel calculating circuit 95. The DRAM interface transmits data to and receives data from the frame buffer 93.

In the image processing device 91, the internal pixel calculating circuit 95 calculates the pixel information including coordinate positions, color information and so forth. The pixel information is supplied to the frame buffer 93 via the pixel buffer 97 and DRAM interface 99, and the frame buffer 93 stores the pixel information.

Recently, between the image processing device 91 and the frame buffer 93, a 64-bit-width data bus 101 is connected. Thereby, the number of pixels which can be accessed at one time increases. For example, as shown in FIG. 2, when the information of one dot is represented by 16 bits, 4 dots can be accessed in one time access. In the frame buffer 93 formed of the DRAM, by increasing the number of bit read/write operations which can be performed at one time in one page mode operation, it is possible to increase the number of dots which can be accessed at one time. Thus, image drawing performance can be improved. The page mode is an access mode in which, as shown in FIG. 3, a $\overline{RAS}$ (Row Address Strobe '', representing active-low or low-enable) signal is active while an address is changed, and, in response thereto, a $\overline{CAS}$ (Column Address Strobe) signal is repetitively active, and thus, data reading and writing can be efficiently performed. At this time, all of the row addresses of data which are successively accessed are equal to each other. Hereinafter, the number of the operations of causing thn $\overline{CAS}$ signal to be successively active in one page mode operation will be referred to as 'the number of times of CAS in the page mode'.

In the image processing device 91 in the related art, the number of times of CAS in the page mode is fixed. For example, the number of times of CAS in the page mode at one time is fixed to be four. Assuming that 4 dots can be processed in one access, in a case of drawing a polygon 103 as shown in FIG. 4, when the line a-b is drawn, although only two dots of data should be written, in one page mode operation, 16 dots (4 (dots)×4 (times)) of data is accessed. Accordingly, access to 14 dots is useless. In the image processing device 91 in the related art, because the number of access operations in one page mode operation is fixed, efficiency may be degraded in consideration of the number of dots which should be processed on a particular occasion.

SUMMARY OF THE INVENTION

An object of the present invention is to provide an image processing device in which, by eliminating the above-mentioned useless access to the frame buffer, a processing efficiency is improved.

A first image processing apparatus according to the present invention performs one of reading and writing of pixel data for a predetermined number of pixels at one access to a frame buffer which stores the pixel data, the frame buffer comprising a memory to which access in a page mode can be performed. The first image processing apparatus comprises:

pixel buffer means for comprising a plurality of stages of pixel buffers connected in series, each thereof storing the pixel data for the predetermined number of pixels; and memory interface means for determining the number of pixel data which is processed successively, based on the pixel data stored in each stage of the pixel buffer, and, in accordance with the determined number of pixel data, determining the number of times of CAS, which is the number of accesses which are performed successively for the same row address in one page mode operation when data is written in the frame buffer.

In a second image processing apparatus according to the present invention and according to the first image processing apparatus:

the pixel data is data of a three-dimension image, the pixel data includes color data, a Z value indicating a depth, an address of the color data, an address of the Z value, information indicating whether or not the pixel data is polygon data and information indicating a polygon type of the pixel data; and the memory interface means compares the row address and polygon type of the pixel data stored in one of the plurality of stages of pixel buffers with the row address and polygon type of the pixel data stored in the subsequent-stage pixel buffer, and, based on the number of stages of pixel buffers which are continuous from the one of the plurality of stages of pixel buffers and, among which, the row addresses and polygon types of the pixel data are equal, determines the number of times of CAS.

In a third image processing apparatus according the present invention and according to the second image processing apparatus, the memory interface means, based on the information indicating the polygon type of the pixel data, determines an access type in which the data is processed, and processes the pixel data based on the access type.

In a fourth image processing apparatus according to the present invention and according to the third image processing apparatus, the access type can be a type in which the Z value stored in at least one of the plurality of stages of the pixel buffers is compared with the Z value stored in the frame buffer, for the same dot, and, when the Z value stored in the at least one of the plurality of stages of the pixel buffers indicates a position nearer to a viewer than a position indicated by the Z value stored in the frame buffer, the Z value stored in the at least one of the plurality of stages of the pixel buffers is overwritten in the frame buffer for the dot.

In a fifth image processing apparatus according to the present invention and according to the third image processing apparatus, the access type can be a type in which color calculation is performed on the color data of the pixel data stored in at least one of the plurality of stages of the pixel buffers and the color data stored in the frame buffer for the same dot, and the color data which is the color calculation result is overwritten in the frame buffer for the dot.

In a sixth image processing apparatus according to the present invention and according to the third image processing apparatus, the access type can be a type in which the color data of the pixel data stored in at least one of the plurality of stages of the pixel buffers is overwritten in the frame buffer.

In the above-described image processing apparatuses according to the present invention, the number of pixel data which is processed successively is determined based on the pixel data stored in each stage of the pixel buffer, and, in accordance with the determined number of pixel data, the number of times of CAS, which is the number of accesses which are performed successively for the same row address in one page mode operation when data is written in the frame buffer, is determined. Thereby, it is possible to eliminate useless access to the frame buffer and the data processing efficiency is improved. Further, some access types for processing polygons are set, and by combining these access types and processing polygons based on the information indicating the polygon type of the pixel data, a Z-buffer method, an alpha blending operation and so forth can be performed.

Other objects and further features of the present invention will become more apparent from the following detailed description when read in conjunction with the accompanying drawings.

BRIEF DESCRIPTION OF THE DRAWINGS

FIG. 7 shows an arrangement of pixel data;

FIG. 8 illustrates a relationship between pixel data and dots;

DETAILED DESCRIPTION OF THE PREFERRED EMBODIMENTS

With reference to the following figures, an image processing apparatus in a first embodiment of the present invention will be described.

1. Arrangement

Figure 1:
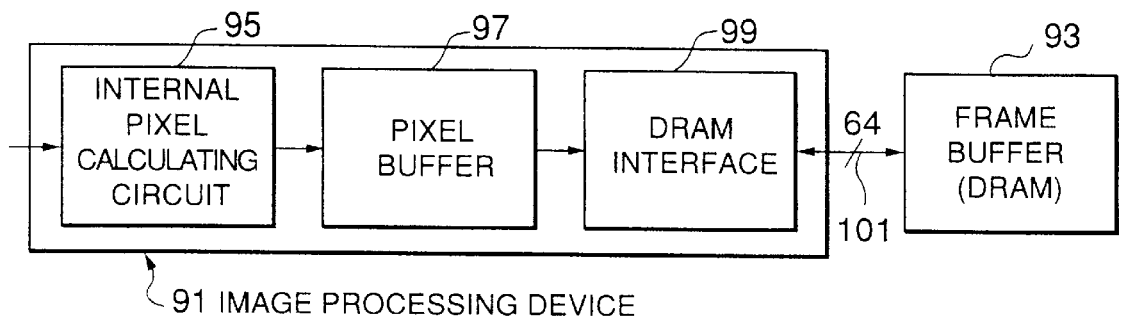
FIG. 1 shows a block diagram of an image processing apparatus in the related art.
Figure 2:
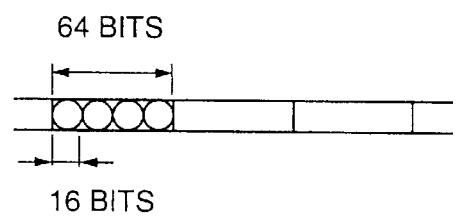
FIG. 2 shows a relationship between a data bus width and the number of dots which can be accessed at the same time.
Figure 3:
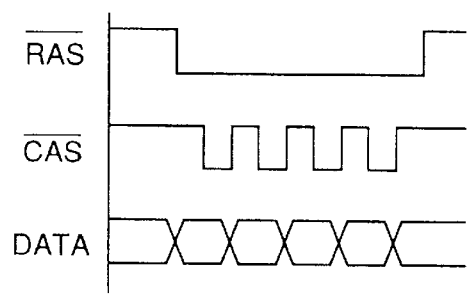
FIG. 3 illustrates a page mode.
Figure 4:
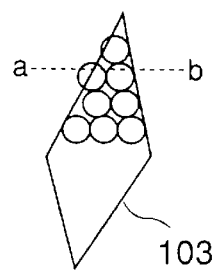
FIG. 4 illustrates drawing dots of a polygon.
Figure 5:
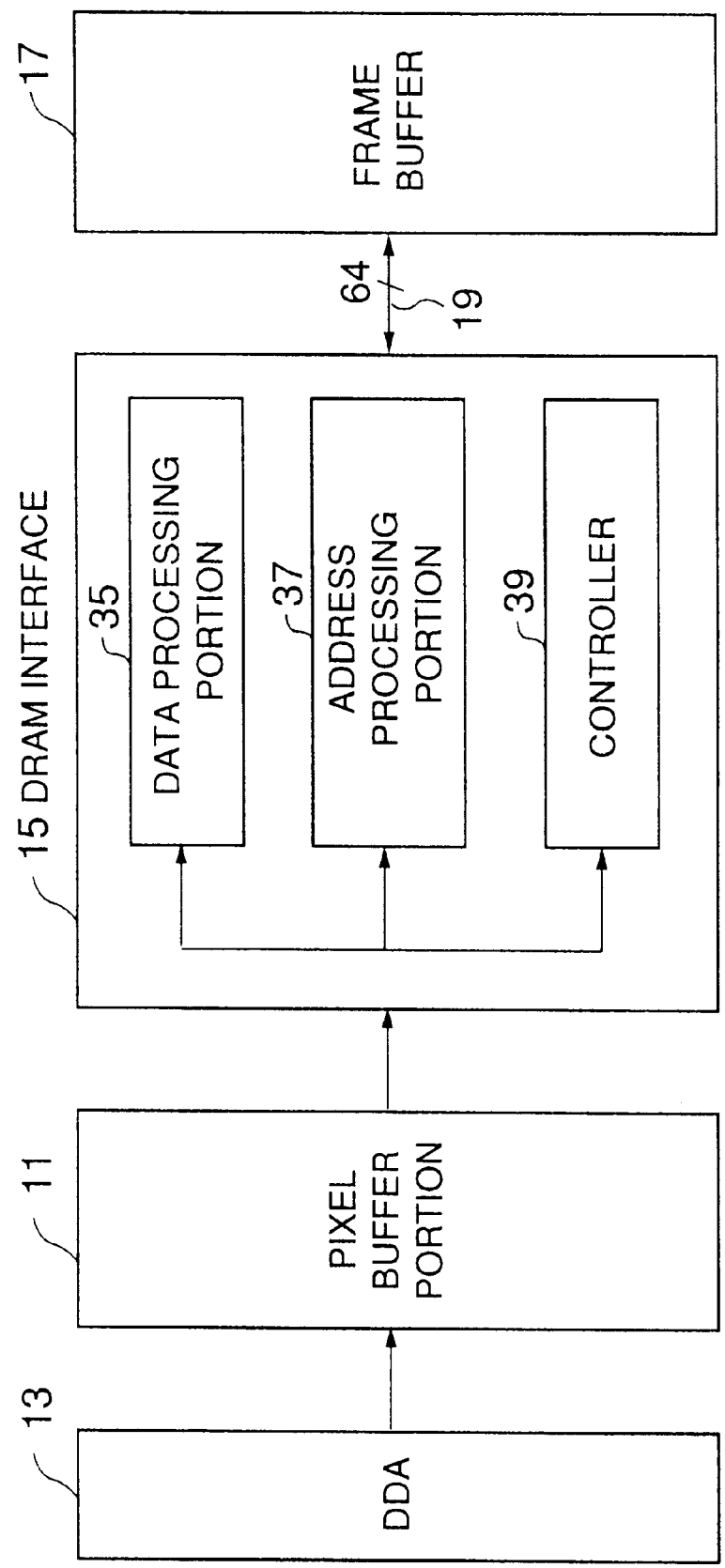
FIG. 5 shows a block diagram of a pixel buffer portion a DRAM interface in a first embodiment of the present invention.

FIG. 5 shows a block diagram of a pixel buffer portion and a DRAM interface in an image processing device in the first embodiment of the present invention.

As shown in the figure, the pixel buffer portion 11 is connected with a DDA (Digital Differential Analyzer) 13 and with the DRAM interface 15. The DDA 13 performs an interpolating operation of image data. The DRAM interface 15 is connected to a frame buffer 17 which stores pixels of image data correspondingly to a display area for each pixel. Between the DRAM interface 15 and the frame buffer 17, a 64-bit-width data bus 19 is connected. Via the data bus 19, three-dimension image data, which is input to the pixel buffer portion 11 from the DDA 13, is supplied to and stored in the frame buffer 17. Although not shown in the figure, an address bus 69 and a control line are connected between the DRAM interface 15 and the frame buffer 17. The arrangements of the frame buffer 17, pixel buffer portion 11 and DRAM interface 15 will be described, one by one.

1.1. Frame Buffer

Figure 6:
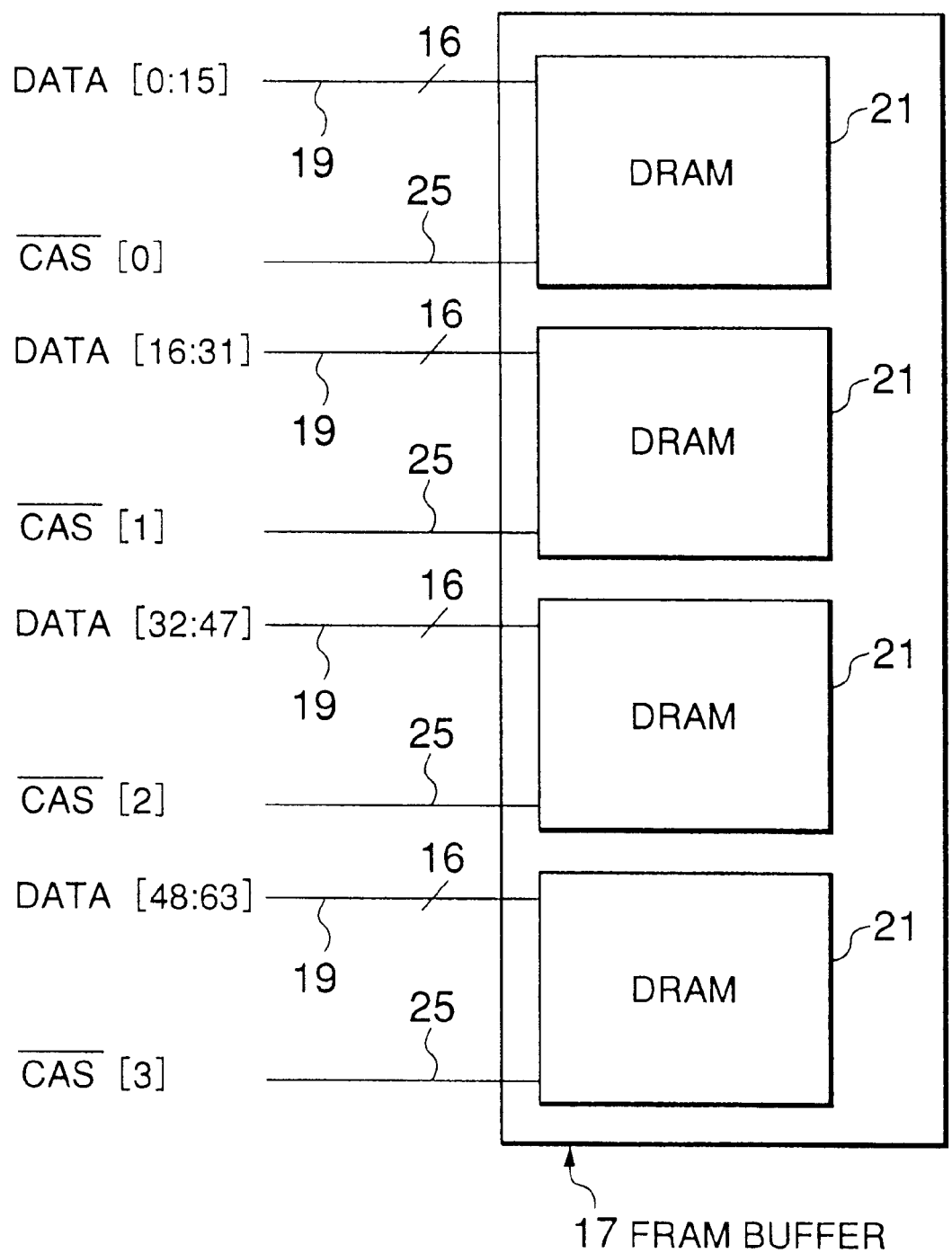
FIG. 6 shows an arrangement of a frame buffer.

FIG. 6 shows an arrangement of the frame buffer 17 in the first embodiment. The frame buffer 17 includes 4 DRAMs (Dynamic RAMs) 21, each able to input and output 16-bit data. A data line, an address line, and signal lines such as a $\overline{RAS}$ signal line, a $\overline{CAS}$ signal line, and a $\overline{WE}$ (write enable) line are connected with each DRAM 21. (In the figure, for the sake of simplification, only the data line 19 and $\overline{CAS}$ line 25 are indicated.) The four DRAMs 21 are provided for 4 dots which are accessed at one time. Data input via the 64-bit-width data bus 19 is divided into four divisions, each being 16-bit data. Each division is input to the respective one of the four DRAMs 21. At this time, only the $\overline{CAS}$ lines 25 for the certain DRAMs 21 of the four DRAMs 21 to which data is written are active, and the data is written in these DRAMs 21.

1-2. Pixel Buffer Portion

Before describing the pixel buffer portion 11, pixel data which is data stored in the pixel buffer portion 11 will now be described. FIG. 7 shows arrangements of the pixel data. The pixel data includes color data (PD), a Z value (ZD), a color-data address (PA), a Z-value address (ZA), a flag (PF) and a flag (FD). The color data (PD) is information indicating the color of the dot. The Z value (ZD) is information indicating the depth of the dot. The flag (PF) indicates whether or not the dot is polygon data. Hereinafter, the flag (PF) will be referred to as 'polygon flag'. The flag (FD) indicates the type of the polygon of the dot. Hereinafter, the flag (FD) will be referred to as 'polygon-type flag'.

As shown in FIG. 7, the color data PD includes 15 bits: 5 bits for R, 5 bits for G and 5 bits for B. The Z value includes 16 bits. Each of the color-data address PA and the Z-value address ZA includes 19 bits. The polygon flag PF includes 1 bit. The polygon-type flag FD includes 2 bits. The first bit of the polygon type flag FD indicates on or off of an alpha-blending operation which is a translucence operation. The last bit of the polygon type flag FD indicates on or off of a Z-buffer operation. The pixel data is processed in accordance with the polygon type indicated by the polygon-type flag FD. Further, as described above, the DRAM interface 16 inputs data from and outputs data to the frame buffer 17 using the 64-bit-width data bus 19. As a result, as shown in FIG. 8, access of data of 4 dots can be performed at the same time.

Figure 9:
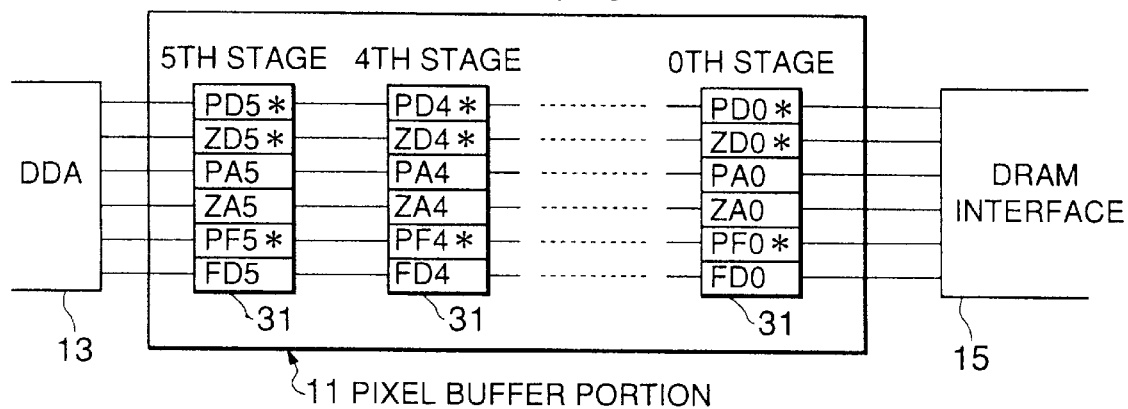
FIG. 9 shows an arrangement of the pixel buffer portion.
Figure 10:
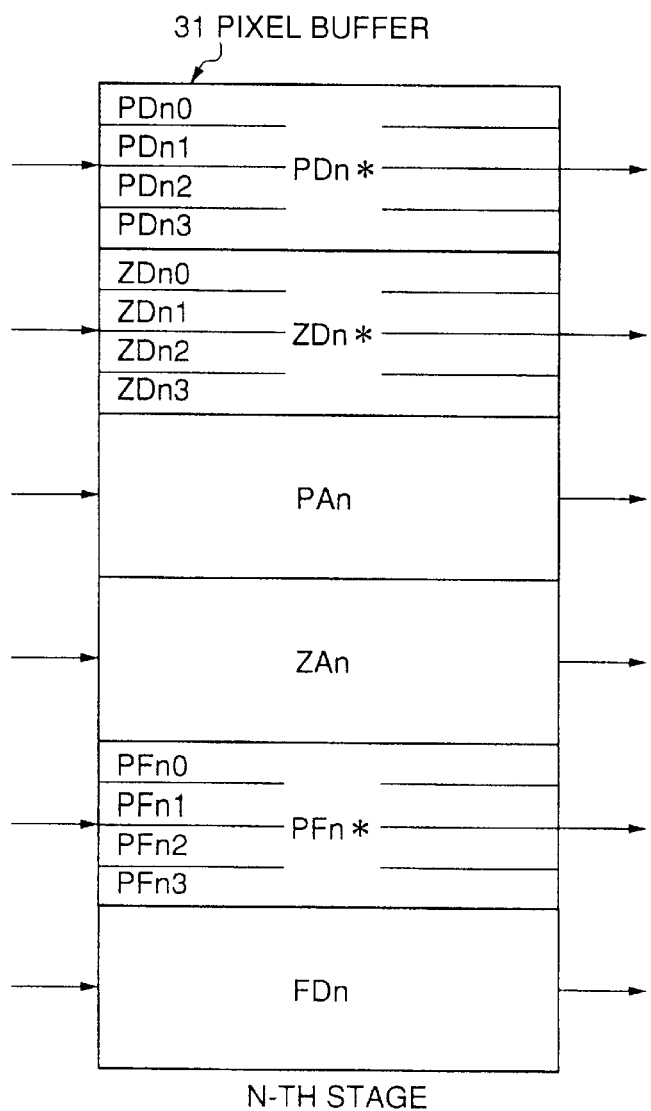
FIG. 10 shows an arrangement of one stage of pixel buffer.

FIG. 9 shows an arrangement of the pixel buffer portion 11. The pixel buffer portion 11 includes six stages of pixel buffers 31 which are connected in series. FIG. 10 shows an arrangement of the n-th-stage (n=1 through 5) pixel buffer 31. The pixel buffer 31 includes a plurality of buffers for the above-described pixel data. Specifically, the pixel buffer 31 includes a color-data buffer PDn for storing the color data, a Z-value buffer ZDn for storing the Z value, a color-data-address buffer PAn for storing the color-data address, a Z-value-address buffer ZAn for storing the Z-value address, a polygon-flag buffer PFn for storing the polygon flag and a polygon-type-flag buffer FDn for storing the polygontype flag.

Each of the color-data buffer PDn, the Z-value buffer ZDn and the polygon-flag buffer PFn includes 4 registers for enabling accessing data of 4 dots to the frame buffer at one time, each resister being provided for the respective one of the 4 dots. Specifically, in the n-th pixel buffer, the color-data buffer PDn includes 4 registers, PDn0 through PDn3, the Z-value buffer ZDn includes 4 registers, ZDn0 through ZDn3, and the polygon-flag buffer PFn includes 4 registers, PFn0 through PFn3. Hereinafter, in the name of the registers in the pixel buffer 31, the first number indicates the number of the stage of the buffer (0 through 5), and the second number indicates a dot of 4 dots which can be accessed at the same time. Further, '*' is used for indicating together data of 4 dots which are accessed at the same time.

1-3. DRAM Interface

As shown in FIG. 5, the DRAM interface 15 includes a data processing portion 35 for processing image data, an address processing portion 37 for controlling output of addresses of the image data, and a controller 39 which controls the operations of the above-mentioned processing portions 35 and 37. Each portion will now be described.

1-3-1. Data Processing Portion

Figure 11:
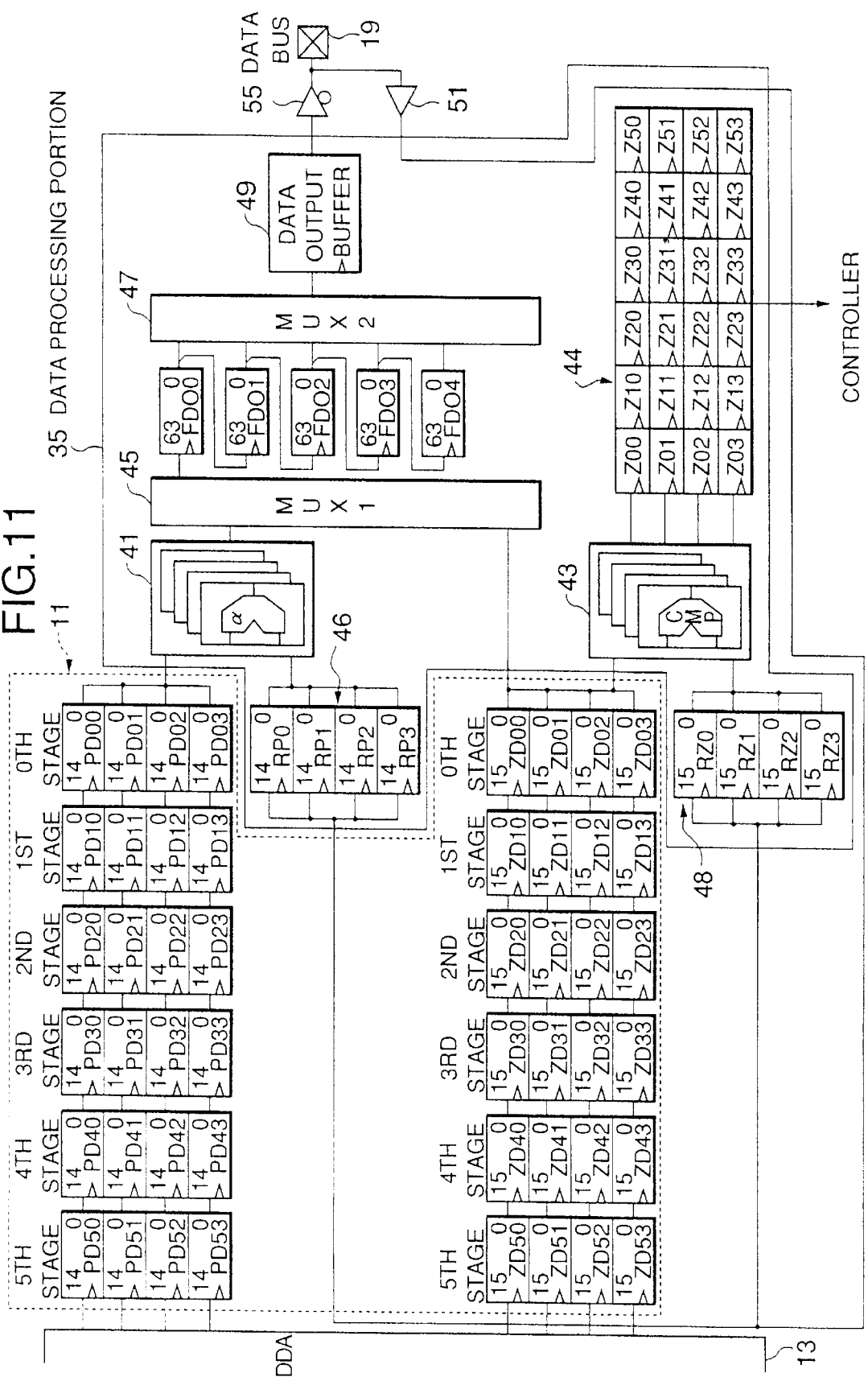
FIG. 11 shows an arrangement of a data processing portion of the DRAM interface.

FIG. 11 shows a portion of the pixel buffer portion 11 and the data processing portion 35 of the DRAM interface 15. In the figure, the portion defined by the broken line is the portion of the pixel buffer portion 11. This portion of the pixel buffer portion 11 includes the 6 stages of color-data buffers PD0* through PD5* and the 6 stages of the Z-value buffers ZD0* through ZD5*. The data processing portion 35 includes registers 46, RP0 through RP3, color calculating circuits 41, registers 48, RZ0 through RZ3, comparators 43, registers 44, Z00 through Z50, Z01 through Z51, Z02 through Z52, and Z03 through Z53, a first multiplexer 45, registers FDO0 through FDO4, a second multiplexer 47 and a data output buffer 49. The registers 46, RP0 through RP3, store color data read from the frame buffer 17 for using the color data in the alpha blending. The registers 48, RZ0 through RZ3, store Z-value data read from the frame buffer 17 for using the Z-value data in the Z-buffer method. The comparators 43 compare the Z values. The registers 44, Z00 through Z50, Z01 through Z51, Z02 through Z52, and Z03 through Z53 store the results of the Z-value comparison in the Z-buffer method. The first multiplexer 45 selects one of the color data and the Z-value data and outputs the selected one. The registers FDO0 through FDO4 temporarily store data for timing adjustment. The second multiplexer 47 selects one of the values of the registers FDO0 through FDO4 and outputs the selected one.

In the portion of the pixel buffer portion 11, the color data is input to the color data buffer PD5* from the DDA 13, and the Z-value data is input to the Z-value buffer ZD5* from the DDA 13. In the data processing portion 35, the color data and Z-value data stored in the frame buffer 17 are input to the registers 46, RP*, and registers 48, RZ*, respectively, via a buffer 51 and the data bus 19. The values of the color-data buffer PD0* and the registers 46, RP*, are input to the color calculating circuits 41. The values of the Z-value buffer ZD0* and registers 48, RZ*, are input to the comparators 43. The comparison results of the comparators 43 are input to the registers 44, Z00 through Z50, Z01 through Z51, Z02 through Z52, and Z03 through Z53. The values of the color calculating circuits 41 and the Z-value buffer ZD0* are input to the first multiplexer 45, and the values selected by the first multiplexer 45 are input to the register FDO0. The registers FDO0 through FDO4 are connected in series in the stated order, and the values of the registers FDO0 through FDO3 are input to the subsequent registers FDO1 through FDO4, respectively. Each of the values of the registers FDO0 through FDO4 is input to the second multiplexer 47. The value selected by the second multiplexer 47 is output to the data bus 19 via the data output buffer 49 and a tri-state buffer 55.

1-3-2. Address Processing Portion

Figure 12:
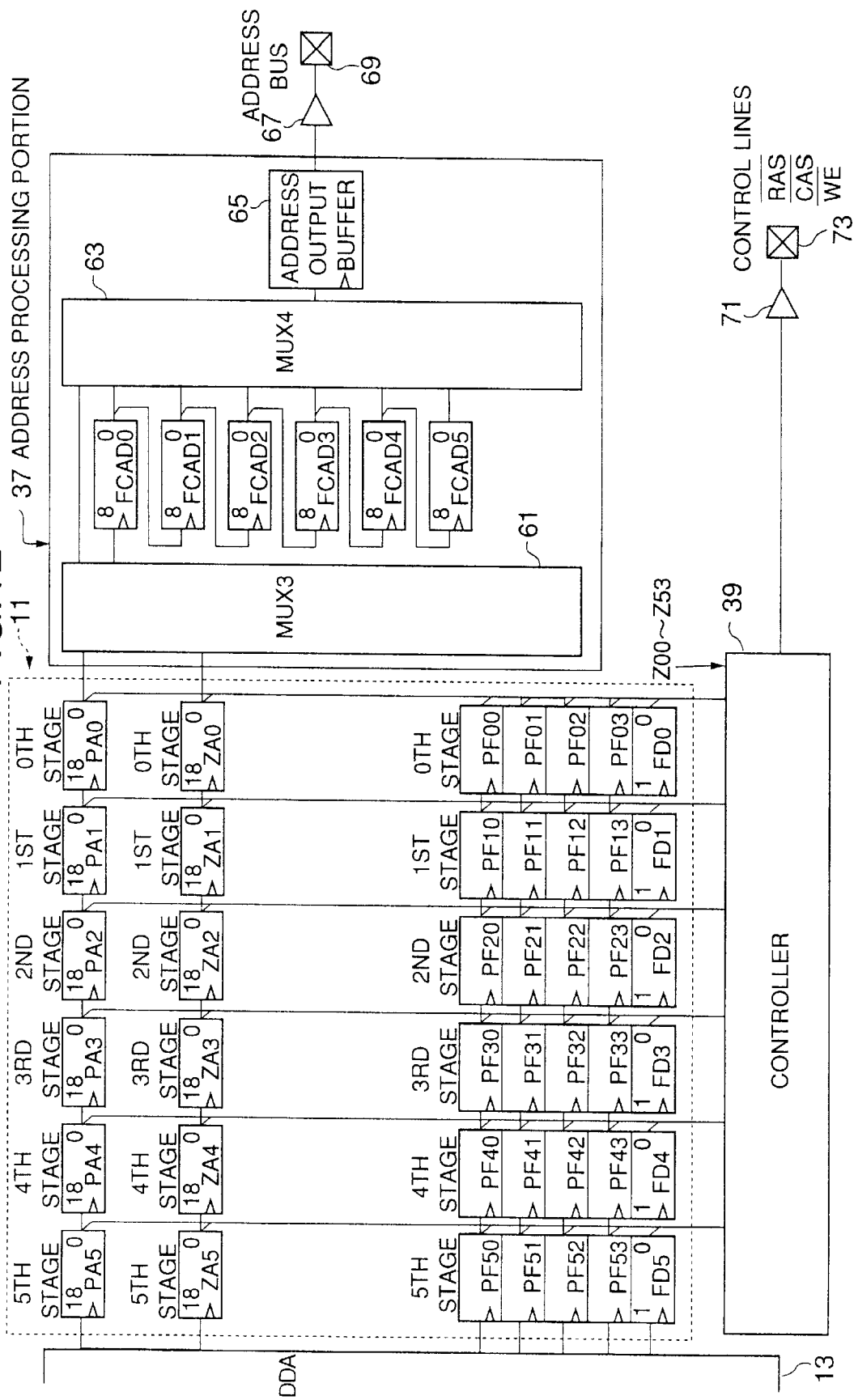
FIG. 12 shows an arrangement of an address processing portion of the DRAM interface.

FIG. 12 shows a portion of the pixel buffer portion 11 and the address processing portion 37 of the DRAM interface 15. In the figure, the portion defined by the broken line is the portion of the pixel buffer portion 11. The portion of the pixel buffer portion 11 includes the color-data-address buffers PA0 through PA5, the Z-value-address buffers ZA0 through ZA5, the polygon-flag buffers PF0* through PF5* and the polygon-type-flag buffers FD0 through FD5. The address processing portion 37 includes a third multiplexer 61, registers FCAD0 through FCAD5, a fourth multiplexer 63 and an address output buffer 65. The third multiplexer 61 selects one of the address of the color data or the address of the Z-value data, and outputs the selected one. The registers FCAD0 through FCAD5 temporarily store the addresses for timing adjustment. The fourth multiplexer 63 selects one of the values of the registers FCAD0 through FCAD5 and outputs the selected one.

The color-data address, Z-value address, polygon flag, and polygon-type flag are input from the DDA 13 to the color-data-address buffer PA5, Z-value-address buffer ZA5, polygon-flag buffer PF5* and polygon-type-flag buffer FD5 in the portion of the pixel buffer portion 11. The values of the color-data-address buffer PA0 and the Z-value-address buffer ZA0 are input to the third multiplexer 61, and, the value selected by the third multiplexer 61 is input to the register FCAD0 and the fourth multiplexer 63. The registers FCAD0 through FCAD5 are connected in series in the stated order, and the values of the registers FCAD0 through FCAD4 are input to the subsequent registers FCAD1 through FCAD5, respectively. The values of the registers FCAD0 through FCAD5 are input to the fourth multiplexer 63. The value selected by the fourth multiplexer 63 is output to the address bus 69 via the address output buffer 65 and a buffer 67.

In the first embodiment, in the 19 bits of each of the color-data address and the Z-value address, the more significant 10 bits are used as a row address and the less significant 9 bits are used as a column address. Each of the registers FCAD0 through FCAD5 stores the column address of the color-data address or the Z-value address. Further, the buffers PD0* through PD5*, ZD0* through ZD5*, PA0 through PA5, PF0* through PF5*, and FD0 through FD5 included in the pixel buffer 31 are formed of latches. The other buffers are formed of flip-flops.

1-3-3. Controller

Figures 13, 14:
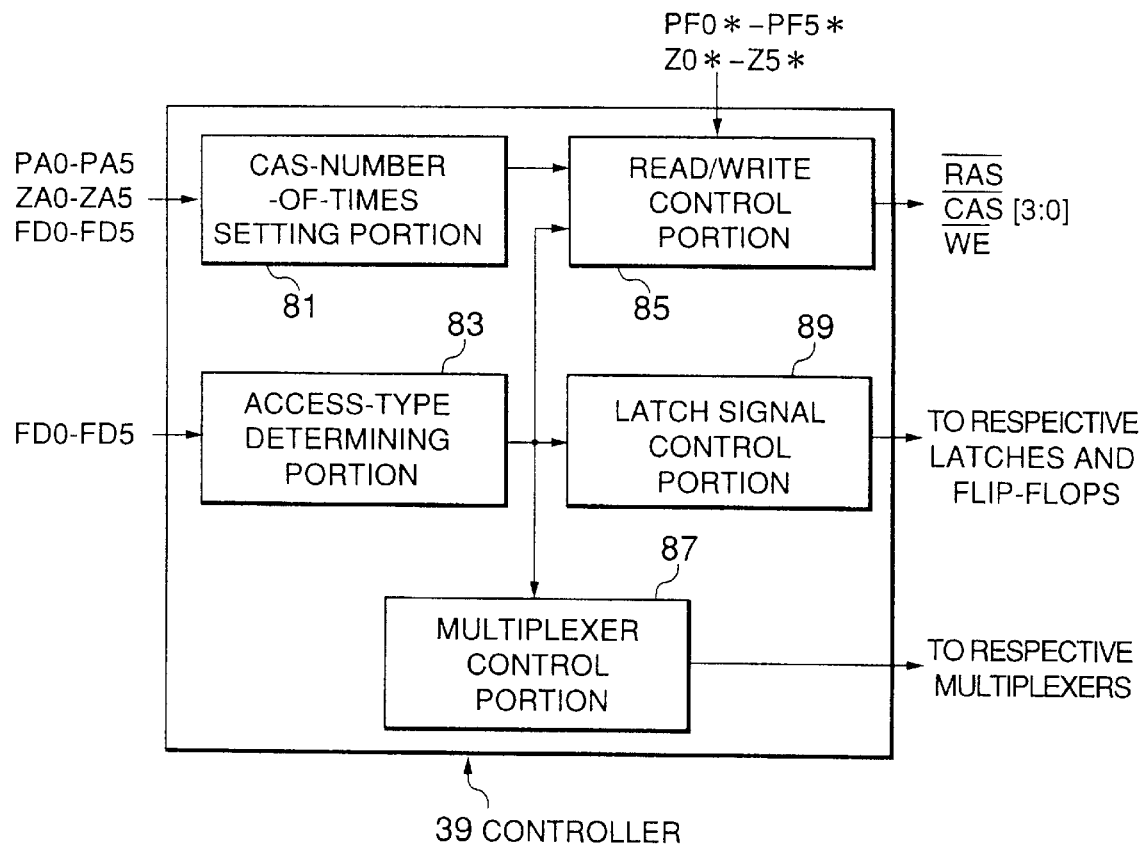
FIG. 13 shows an arrangement of a controller of the DRAM interface.
FIG. 14 shows a relationship between polygon types and access types.

FIG. 13 shows a block diagram of the controller 39 of the DRAM interface 15. As shown in the figure, the controller 39 includes a CAS-number-of-times setting portion 81, an access-type determining portion 83, a read/write control portion 85, a multiplexer control portion 87 and a latch-signal control portion 89. The values of the color data-address buffers PA0 through PA5, the Z-value-address buffers ZA0 through ZA5 and polygon-type-flag buffers FD0 through FD5 are input to the CAS-number-of-times setting portion 81. Based on the values, the number of times of $\overline{CAS}$ in the page mode is set. The values of the polygon-type-flag buffers FD0 through FD5 are input to the access-type determining portion 83. Based on the values, an access type is determined. (The access type will be described later.) The determination result of the access-type determining portion 83 is input to the multiplexer control portion 87. Based on the determination result, the respective multiplexers 45, 47, 61 and 63 are controlled. The determination result of the access-type determining portion 83 is input also to the latch-signal control portion 89. Based on the determination result, the respective latches and flip-flops are controlled. The number of times of CAS set by the CAS-number-of-times setting portion 81 and the determination result of the access-type determining portion 83 are input to the read/write control portion 85. Further, for controlling the $\overline{CAS}$ signal, the values of the polygon-flag buffers PF0* through PF5* and the Z-value comparison results Z0* through Z5* are input to the read/write control portion 85, which generates the control signals such as the $\overline{RAS}$ signal, the $\overline{CAS}$ signal, the $\overline{WE}$ signal and so forth and outputs them to the frame buffer 17.

2. Operations

Operations of the pixel buffer portion 11 and DRAM interface 15 will be now described in detail.

When writing the pixel data, sent from the DDA 13, in the frame buffer 17, the pixel buffer portion 11 and DRAM interface 15 in the first embodiment first set the number of times of causing the $\overline{CAS}$ signal to be successively active in one page mode operation and the access type. Then, based on the setting, access to the frame buffer 17 is performed. First, operations of setting of the number of times of $\overline{CAS}$ in the page mode and the access type will be described. Then, general operations using specific examples will be described.

2-1. Setting of the Number of Times of CAS in the Page Mode

In the pixel buffers 31 in the first embodiment, when the pixel data is input to the pixel buffers 31 from the DDA 13, the input pixel data is shifted from the 5th-stage through 0th-stage pixel buffers 31 in sequence. When the data is stored in the 0th-stage pixel buffer 31, the controller 39 of the DRAM interface 15 sets the number of times of CAS (successively caused to be active) in one page mode operation in the procedure which will be described.

The number of times of CAS (successively performed) in the page mode is set by the CAS-number-of-times setting portion 81 of the controller 39. The CAS-number-of-times setting portion 81 compares the row address of the color data, the row address of the Z value and the value of the polygon-type flag of the pixel data stored in the 0th-stage pixel buffer 31 with those of the pixel data stored in the other stages of the pixel buffers 31. Then, it is determined how many stages of the pixel buffers 31, continuous from the 0th-stage pixel buffer 31, are present, each of which pixel buffers stores the pixel data having the values, all of which are the same as those of the pixel data stored in the 0th-stage pixel buffer 31, as a result of the comparison. The CAS-number-of-times setting portion 81 sets this number of stages to be the number of times of CAS in the page mode.

For example, when the row addresses of the color data, the row addresses of the Z values, and the values of the polygon-type flags of the pixel data stored in the registers of the stages from the 0th stage through the 5th stage are all the same as each other, the CAS-number-of-times setting portion 81 examines the number of stages for which the data such as the row addresses and so forth are equal, and it is determined that the number is the six stages from the 0th stage through the 5th stage. Accordingly, the CAS-number-of-times setting portion 81 sets the number of times of $\overline{CAS}$ in the page mode to be six.

2-2. Setting of the Access Type

In the first embodiment, the concept access type' is used. The access type indicates a processing method determined in accordance with a polygon type. 'Type 0' is a type used in the Z-buffer method. In this type, the Z values stored in the frame buffer 17 are compared with the currently processed Z values for the currently processed dots, respectively. Thus, the Z values which represent positions displayed nearer to the viewer are written in the frame buffer 17. 'Type 1' is a type used in the alpha blending. In this type, color calculations are performed on the color data stored in the frame buffer 17 and color data currently being processed. Thus, new color data is written in the frame buffer 17. 'Type 2' is a type in which color data is written in the frame 17 buffer without performing alpha blending. By appropriately combining these access types, various polygon drawings are possible.

FIG. 14 shows a relationship between polygon types and access types. For example, as shown in the figure, when the polygon type is such that the pixel data is processed in the Z-sorting method, the pixel data is processed in the type 2. When the polygon type is such that the pixel data is processed in the Z-sorting method and alpha blending, the pixel data is processed in the type 1. When the polygon type is such that the pixel data is processed in the Z-buffer method, the pixel data is processed in a combination of the type 0 and the type 2. When the polygon type is such that the pixel data is processed in the Z-buffer method and alpha blending, the pixel data is processed in a combination of the type 0 and the type 1.

The access type is determined by the controller 39 after the number of times of CAS in the page mode is set. The access type is set by the access-type determining portion 83 of the controller 39 based on the value of the polygon flag stored in the polygon-type buffers FD0 through FD5. Specifically, when the Z-buffer flag in the polygon-type flag is ON, the access-type determining portion 83 sets the access type to be 'type 0'. When the alpha-blending flag in the polygon-type flag is ON, the access-type determining portion 83 sets the access type to be 'type 1'. When the alpha-blending flag in the polygon-type flag is OFF, the access-type determining portion 83 sets the access type to be 'type 2'.

2-3. Operation Examples

Using some specific examples, operations of the pixel-buffer portion 11 and the DRAM interface 15 will be described with reference to timing charts.

2-3-1. Operation Example 1

In the operation example 1, it is assumed that, when the data is stored in the 0th-stage pixel buffer 31, the values of the row addresses of the respective stages stored in the color-data-address buffers PA0 through PA5 and the Z-value-address buffers ZA0 through ZA5, and the polygon types of the data of the polygon-type flags of the respective stages stored in the polygon-type-flag buffers FD0 through FD5 are all equal to each other among the stages of the pixel buffers 31, and also, the Z-buffer flags of the polygon are all ON. Further, the values of the Z-value buffers ZD0* through ZD5* include data which indicates that the portions of the polygon represented by the data are displayed nearer to the viewer than the portions of the polygon represented by the data stored in the frame buffer 17.

Figure 15:
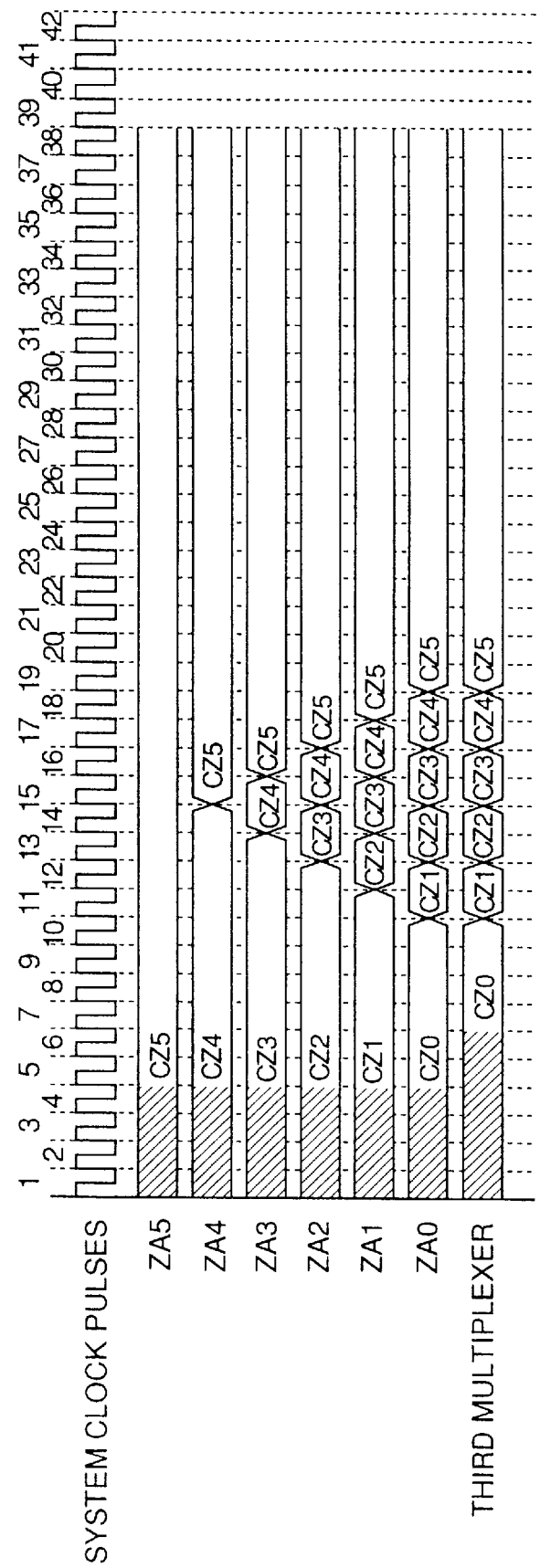
FIG. 15 shows a timing chart of pixel buffers and the DRAM interface (an operation example 1)
Figure 16:
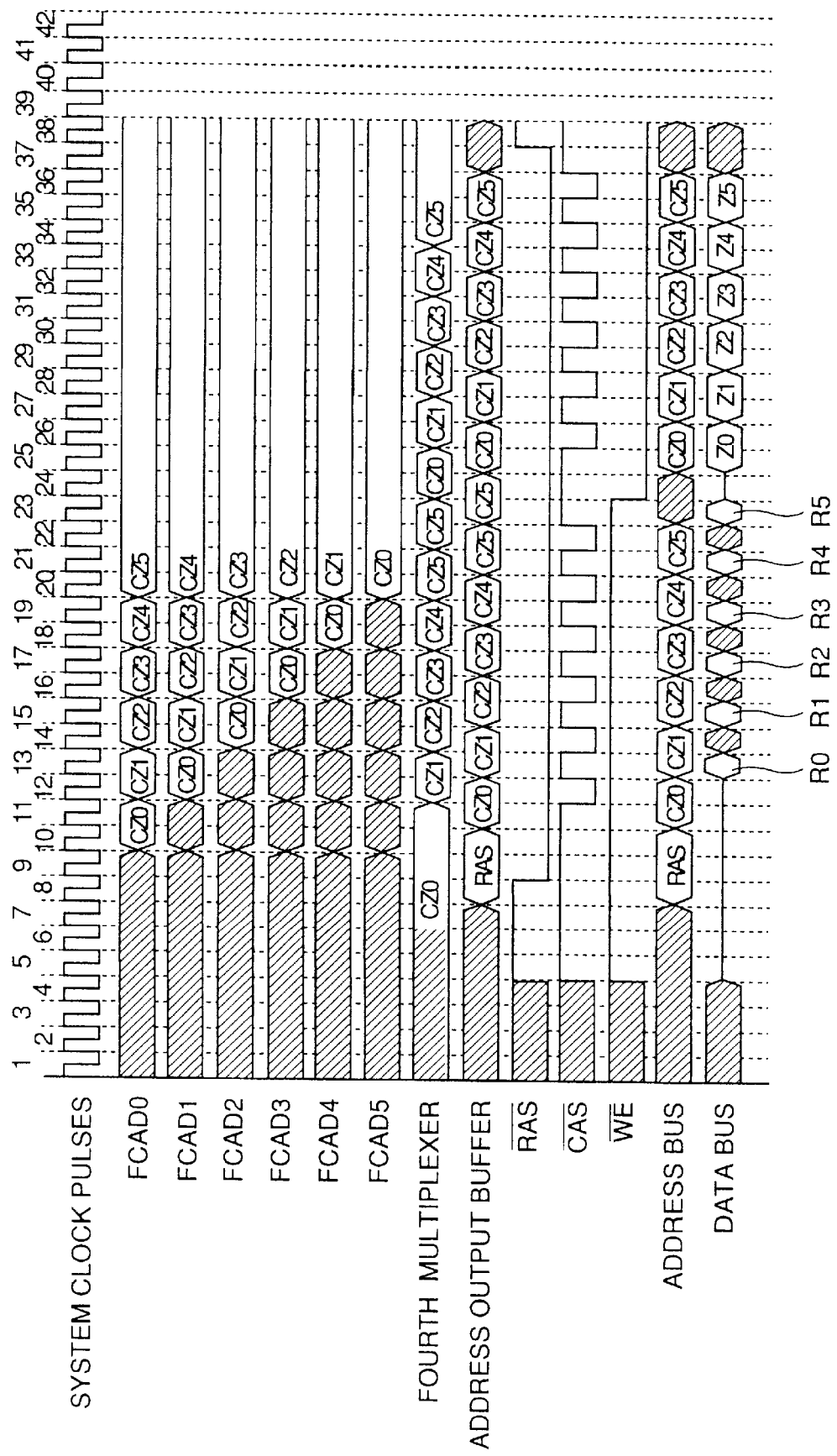
FIG. 16 shows another timing chart of the pixel buffers and the DRAM interface (the operation example 1)
Figure 17:
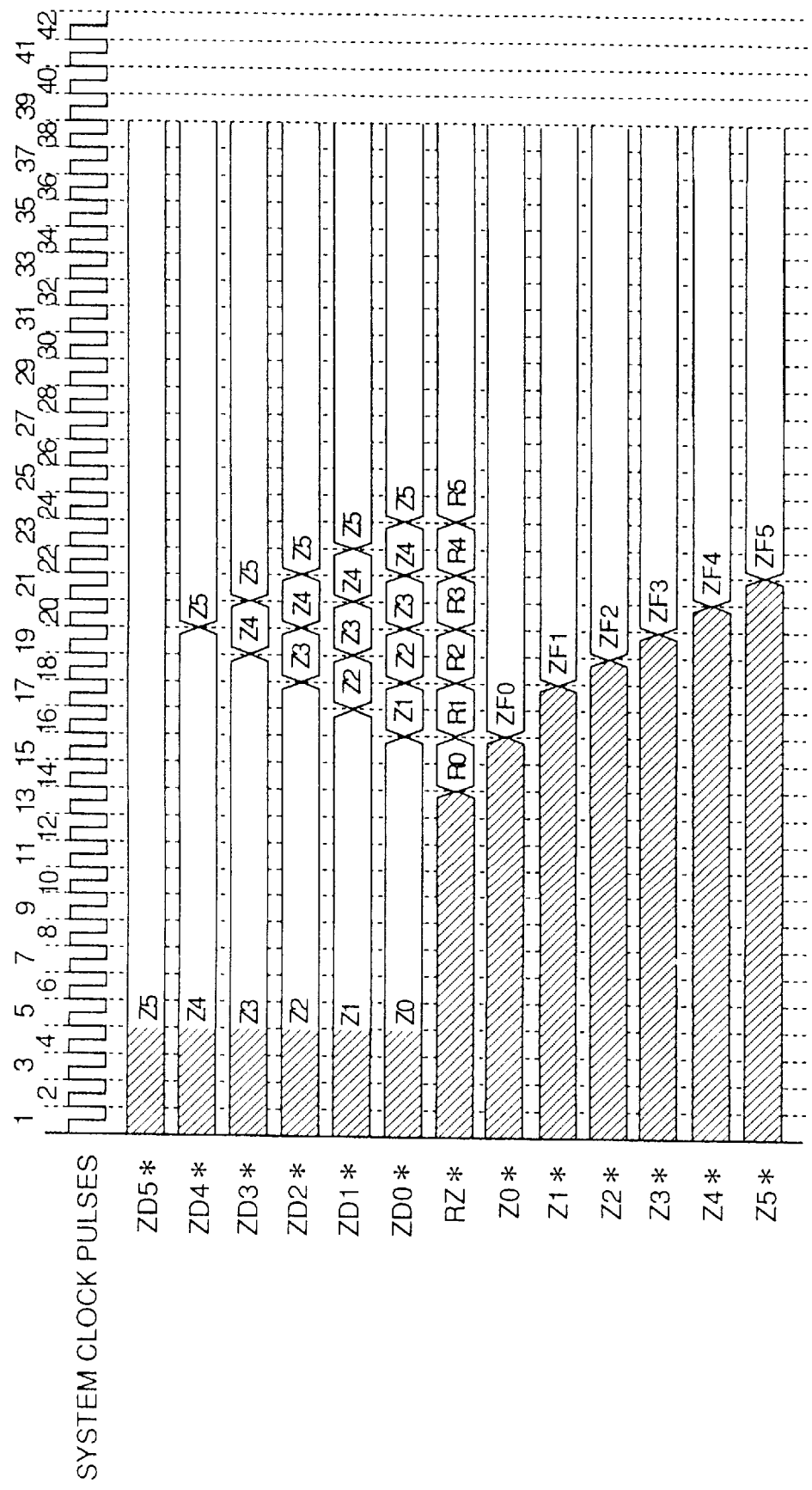
FIG. 17 shows another timing chart of the pixel buffers and the DRAM interface (the operation example 1)
Figure 18:
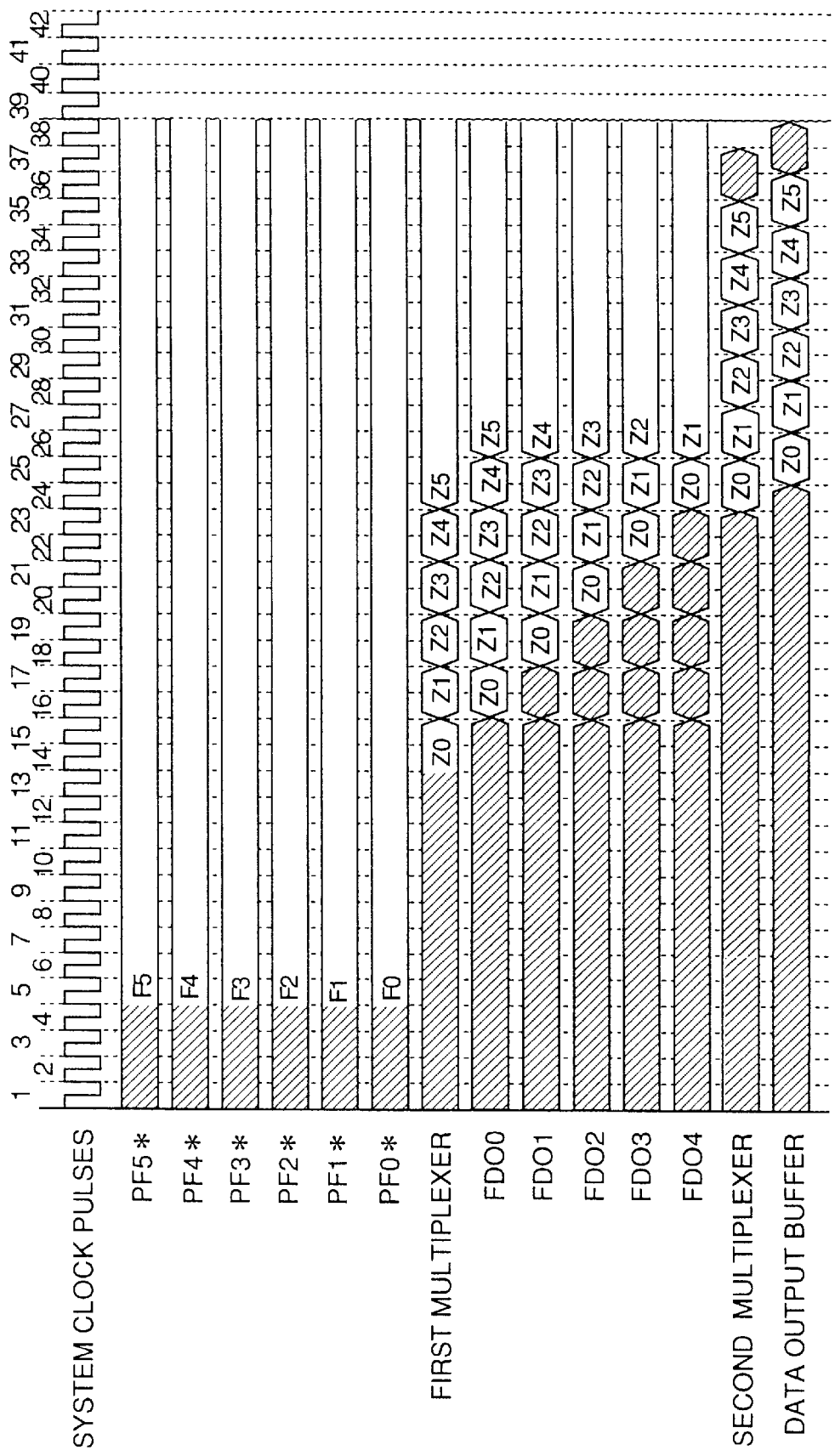
FIG. 18 shows another timing chart of the pixel buffers and the DRAM interface (the operation example 1)

FIGS. 15 through 19 show timing charts of the pixel buffer portion 11 and the DRAM interface 15 in the case of the operation example 1. As shown in FIGS. 15, 17 and 18, at the rising edge of the fifth clock pulse (hereinafter, the timing of the rising edge of the n-th clock pulse being referred to as 'timing n'), values are set in the buffers ZA0 through ZA5, ZD0* through ZD5* and PF0* through PF5*. Then, the controller 39 sets the number of times of CAS in the page mode. Specifically, the CAS-number-of-times setting portion of the controller 39 examines the values of the row addresses and the values of the polygon-type flags of the respective stages of the pixel buffers 31. In the operation example 1, the row addresses of the color data, the row addresses of the Z values and the polygon types, stored in the respective pixel buffers, are identical among the 6 stages of pixel buffers 31, as mentioned above. Accordingly, the number of times of causing the $\overline{CAS}$ signal to be successively active in one page mode operation is six.

Then, the controller 39 determines the access type. Specifically, the access-type determining portion 83, at the timing 6, examines the Z-buffer flags of the polygon-type flags of the pixel data. In the operation example 1, the Z-buffer flags are all ON as mentioned above. Accordingly, the access type is set to be type 0.

The type 0 is the access type used in the Z-buffer method. In this type, the Z values stored in the frame buffer 17 are compared with the Z values currently being processed, for respective dots. Thus, Z values representing the positions displayed nearer to the viewer are written in the frame buffer.

For this purpose, the controller 39 first reads the Z values of the pixel data previously written in the frame buffer 17. Then, the controller 39 compares the read Z values with the Z values of the pixel data currently being processed. Then, based on the comparison results, the controller 39 controls the signals of the $\overline{RAS}$ lines, $\overline{CAS}$ lines and so forth.

As shown in FIG. 15, address values CZ0 through CZ5 are stored in the respective Z-value-address buffers ZA0 through ZA5, from the 0th stage through the 5th stage, respectively. Then, at the timing 11, the address value CZ1 is shifted from the Z-value-address buffer ZA1 to the Z-value-address buffer ZA0. At the subsequent timing 12, the address value CZ2 is shifted from the Z-value-address buffer ZA2 to the Z-value-address buffer ZA1. Similarly, the address values CZ5 through CZ3 are shifted to the Z-value-address buffer ZA4 through ZA2, in sequence, respectively.

In the type 0, the third multiplexer 61 selects the output from the Z-value-address buffer ZA0. Accordingly, via the third multiplexer 61, the value of the column address of the address stored in the Z-value-address buffer ZA0 is output to the shift register FCAD0. (In the timing charts, for the sake of simplification, the values of the entire addresses and the values of the column addresses of these entire addresses are indicated by the same reference symbols, respectively.) Then, the column addresses are shifted from the FCAD0 through FCAD5, in sequence, respectively. The fourth multiplexer 63 first selects an output of the third multiplexer 61, and, at the timing 8, a row address $\overline{RAS}$ is output to the address output buffer 65. Then the fourth multiplexer 63 selects an appropriate one of the outputs of the FCAD0 through FCAD5. Thereby, as shown in FIG. 16, the column addresses CZ0 through CZ5 are output to the address output buffer 65.

Thus, as shown in FIG. 16, from the timing 8 through the timing 21, the row address value RAS, and the column address values CZ0 through CZ5 are output to the address bus 69, in sequence. The row address RAS is the more significant 10 bits of each of CZ0 through CZ5. The operations of the third and fourth multiplexers 61 and 63 are controlled by the multiplexer control portion 87.

As shown in FIG. 16, when the row address RAS is output to the address bus 69 at the timing 8, the controller 39 causes the $\overline{RAS}$ lines to be active at the timing 9. Then, from the timing 12 through the timing 22, in synchronization with the column addresses CZ0 through CZ5 being output to the address bus 69, each $\overline{CAS}$ line is caused to be active six times successively. During this time, the controller 39 controls each $\overline{WE}$ line to be non-active. Thereby, data R0 through R5, specified by the addresses output from the address bus 69, is read from the frame buffer 17, in sequence. The data R0 through R5 read from the frame buffer 17 is, as shown in FIG. 17, stored in the registers 48, RZ*, in sequence, to be used for Z-value comparison.

Further, as shown in FIG. 17, Z values Z0 through Z5 are stored, and, similar to the case of the addresses described above, the Z values are shifted from ZD5* through ZD0*, from the 5th-stage through 0th-stage pixel buffers 31. Specifically, the Z value data Z0 through Z5 is stored, in sequence, in the 0th-stage buffer ZD0*. The values of the Z-value buffer ZD0* are compared with the values stored in the above-mentioned registers 48, RZ*, by the comparators 43, and the comparison results are stored in the comparison-result registers Z0*.

In FIG. 17, at the timing 14, the values Z0 are stored in the Z-value buffer ZD0*, and the values R0 read from the frame buffer 17 are stored in the registers 48, RZ*. The comparators 43 compare the values stored in the respective buffer and registers. At the timing 16, flags ZF0, indicating the comparison results, are stored in the comparison-result register Z0*. The comparison of the Z values are performed for the respective dots, and flags, indicating the comparison results, are stored for the respective dots. Then, as shown in FIG. 17, the values Z1 through Z5 of the Z-value buffer ZD0* are compared with the values R1 through R5 of the registers 48, RZ*, in sequence, respectively. The comparison results ZF1 through ZF5 are stored in the comparison-result registers Z1* through Z5*.

After performing Z-value comparison, the controller 39 performs writing in the frame buffer 17. In the type 0, the first multiplexer 45 selects the output of the ZD0*. Thereby, via the first multiplexer 45, as shown in FIG. 18, at the timing 16, the output of the ZD0* is output to the FDO0. Then, the data is shifted from the register FDO0 through the register FD04 in sequence. As a result of the second multiplexer 47 selecting an appropriate one of the outputs of the registers FDO0 through FD04, as shown in FIG. 18, at the timings 25 through 36, the data is output to the data output buffer 49. During this time, the operations of the first and second multiplexers 45 and 47 are controlled by the multiplexer control portion 87.

Figure 19:
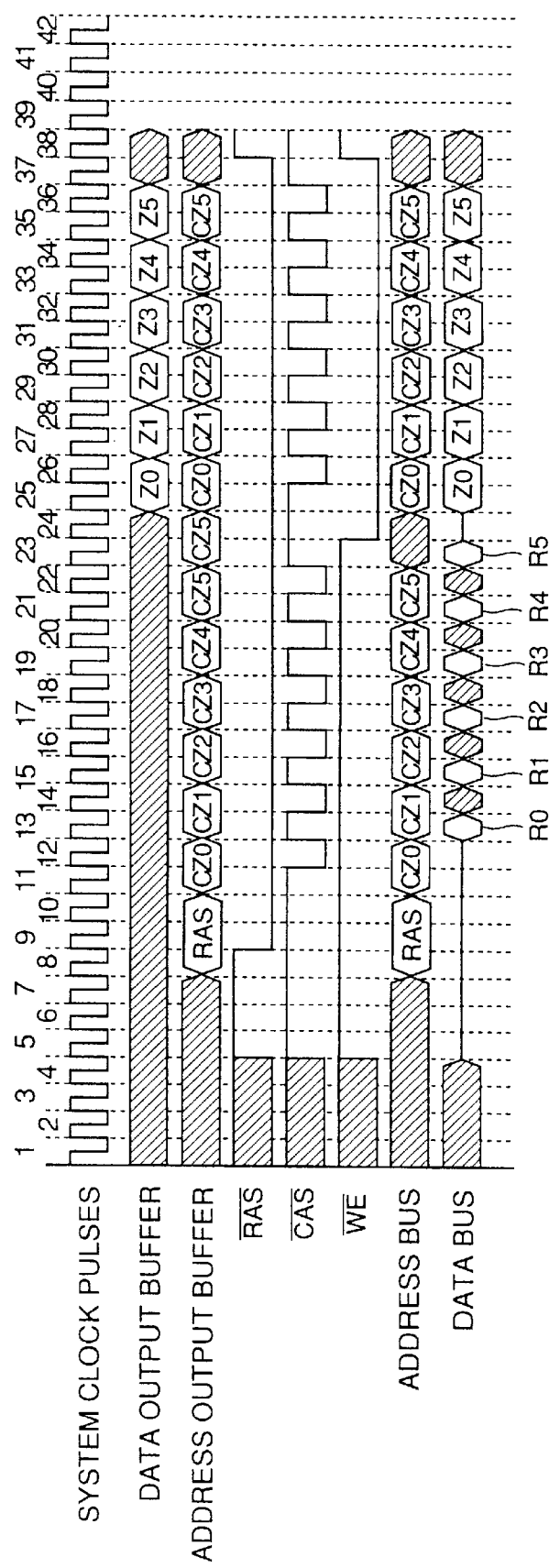
FIG. 19 shows another timing chart of the pixel buffers and the DRAM interface (the operation example 1)

Thus, at the timings 25 through 36, the addresses are output to the address bus 69, and also, the data is output to the data bus 19, in sequence. As shown in FIG. 19, the controller 39 causes each $\overline{WE}$ line to be active from the timing 24 through the timing 37, and, from the timing 26 through the timing 36, the respective $\overline{CAS}$ lines 25 are controlled to be active individually. Thereby, data writing in the frame buffer 17 is possible. In the timing charts in FIGS. 16 and 19, for the sake of simplification, the signals of the four $\overline{CAS}$ lines 25 are indicated by one signal. The read/write control portion 85 of the controller 39 performs control of the $\overline{CAS}$ lines 25. The control of the four $\overline{CAS}$ lines 25 for the frame buffer 17 in the case where the access type is the type 0 will now be described.

In the case where the access type is the type 0, the read/write control portion 85 determines, from the polygon flag stored in the polygon-flag buffer PF, whether or not the dot is polygon data. Further, at the same time, the read/write control portion 85 determines, with reference to the comparison results stored in the comparison-result registers Z0* through Z5*, whether or not the positions represented by the currently processed Z values are displayed nearer to the viewer than the positions represented by the Z values which were previously stored in the frame buffer 17. When the pixel data is polygon data and also the positions represented by the Z values of the pixel data are displayed nearer to the viewer than the positions represented by the Z values which were previously stored in the frame buffer 17, the read/write control portion 85 writes the new Z values in the frame buffer 17. For this purpose, the read/write control portion 85 causes the $\overline{CAS}$ lines 25 for the dots of the new Z values to be active. When the pixel data of the dots is not polygon data, the read/write control portion 85 does not causes the $\overline{CAS}$ lines 25 to be active. Further, when the pixel data of the dots is polygon data, but the positions represented by the Z values of the pixel data are displayed not nearer to the viewer than the positions represented by the Z values which were previously stored in the frame buffer 17, the read/write control portion 85 does not cause the $\overline{CAS}$ lines 25 to be active. The controller 39 causes the $\overline{CAS}$ [0:3] lines 25, which are provided for four dots which can be accessed at the same time, respectively, to be active selectively if necessary. Thus, the controller 39 controls data writing for each dot.

For example, the values of respective polygon-flag buffers PF0* are as follows: PF00=ON, PF01=OFF, PF02=ON and PF03=OFF, and the values of the comparison result registers 44, Z0*, are as follows: Z00=ON, Z01=OFF, Z02=OFF and Z03=OFF. In this case, only the data stored in ZD00 is polygon data and also the position represented by this data is displayed nearer to the viewer than the position represented by the previous data. Accordingly, the data stored in the ZD00 is written in the frame buffer 17.

Figure 20:
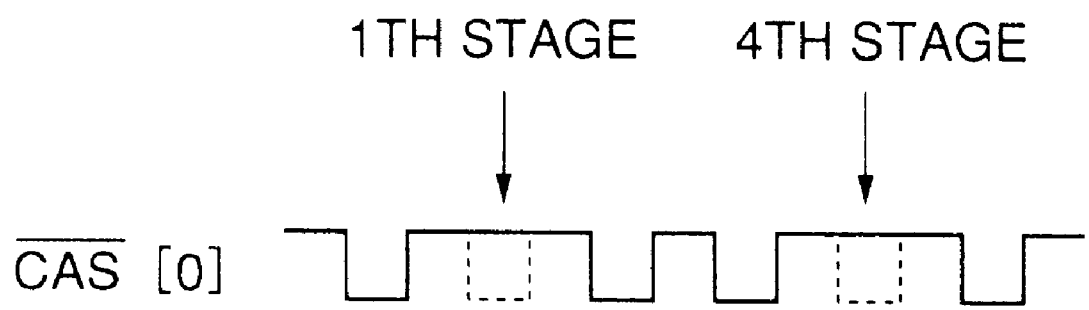
FIG. 20 illustrates control in a case where a $\overline{CAS}$ line is not caused to be active in a page mode.

Further, for example, it is determined that the positions represented by the data of the first dot of the four dots, which can be accessed at the same time, stored in the first-stage pixel buffer 31, in the Z-buffer method, is farther from the viewer than the position represented by the data stored in the frame buffer 17. In this case, this data is not written in the frame buffer 17. Further, it is determined that the position of the data of the first dot of the four dots, which can be accessed at the same time, stored in the fourth-stage pixel buffer 31, in the Z-buffer method, is farther from the viewer than the position represented by the data stored in the frame buffer 17. In this case, this data is also not written in the frame buffer 17. For this purpose, the $\overline{CAS}$ [0] line for the first dot is controlled to be non-active at the timings for the first stage and fourth stage, as shown in FIG. 20.

Thus, in the operation example 1, the number of times of CAS in the page mode is six, the access type is set to be type 0, and data is written in the frame buffer 17.

2-3-2. Operation Example 2

In the operation example 2, it is assumed that, when the data is stored in the 0th-stage pixel buffer 31, the row addresses of the color data, the row addresses of the Z values and the polygon types of the data indicated by the polygon type flags of the pixel data stored in the respective stages of pixel buffers 31 are all equal among the respective stages of pixel buffers 31, and, further, the alpha-blending flags of the polygon-type flags of the pixel data stored in the respective stages of pixel buffers 31 are all ON.

In the operation example 2, similar to the case of the operation example 1, the row addresses of the color data and the row addresses of the Z values stored in the registers for all the stages are equal among the stages, and also, the polygon types stored in the registers for all the stages are equal among the stages. Accordingly, the number of times of CAS in the page mode is six. Further, the controller 39 examines, at the timing 6, the alpha-blending flags of the pixel data. Because the alpha-blending flags are all ON, the access type is set to be the type 1.

When the access type is the type 1, color calculations are performed on the color data stored in the frame buffer 17 and color data currently being processed, and new color data is written in the frame buffer 17. For this purpose, the $\overline{RAS}$ lines, $\overline{CAS}$ lines and so forth are controlled so that the color data stored in the frame buffer 17 is read in sequence. Then, a calculation is performed on the read color data and the color data currently being processed, and the result of the calculation is written in the frame buffer 17. These operations will be described with reference to timing charts shown in FIGS. 21 through 24.

Figure 21:
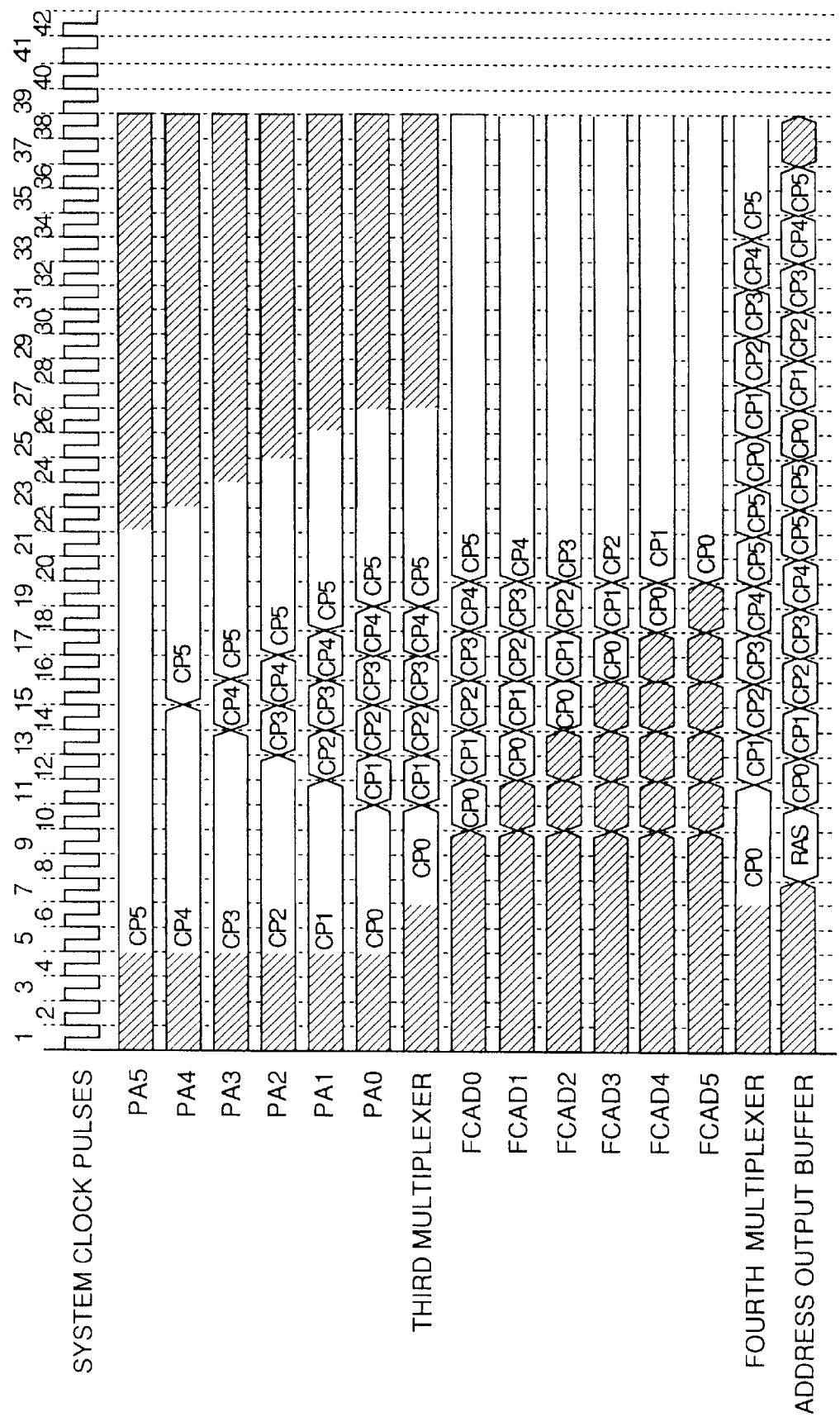
FIG. 21 shows a timing chart of the pixel buffers and the DRAM interface (the operation example 2)

As shown in FIG. 21, address values CP0 through CP5 are stored in the color-data-address buffer PA0 through PA5, respectively. Then, similar to the above-described case of the type 0, the addresses are shifted from the PA5 through PA0 in sequence. In the case of the type 1, the third multiplexer 61 selects the output from the color-data-address buffer PA0. Thereby, via the third multiplexer 61, the value of the color-data-address buffer PA0 is shifted from the register FCAD0 through register FCAD5 in sequence. The fourth multiplexer 63 selects an appropriate one of the outputs of the third multiplexer 61 and registers FCAD0 through FCAD5. Thereby, as shown in FIG. 21, from the timing 8 through the timing 36, the row address RAS and the column addresses CP0 through CP5 are output to the address output buffer 65. At the same time, as shown in FIG. 24, the row address RAS and the column addresses CP0 through CP5 are output to the address bus 69 in sequence.

Figure 24:
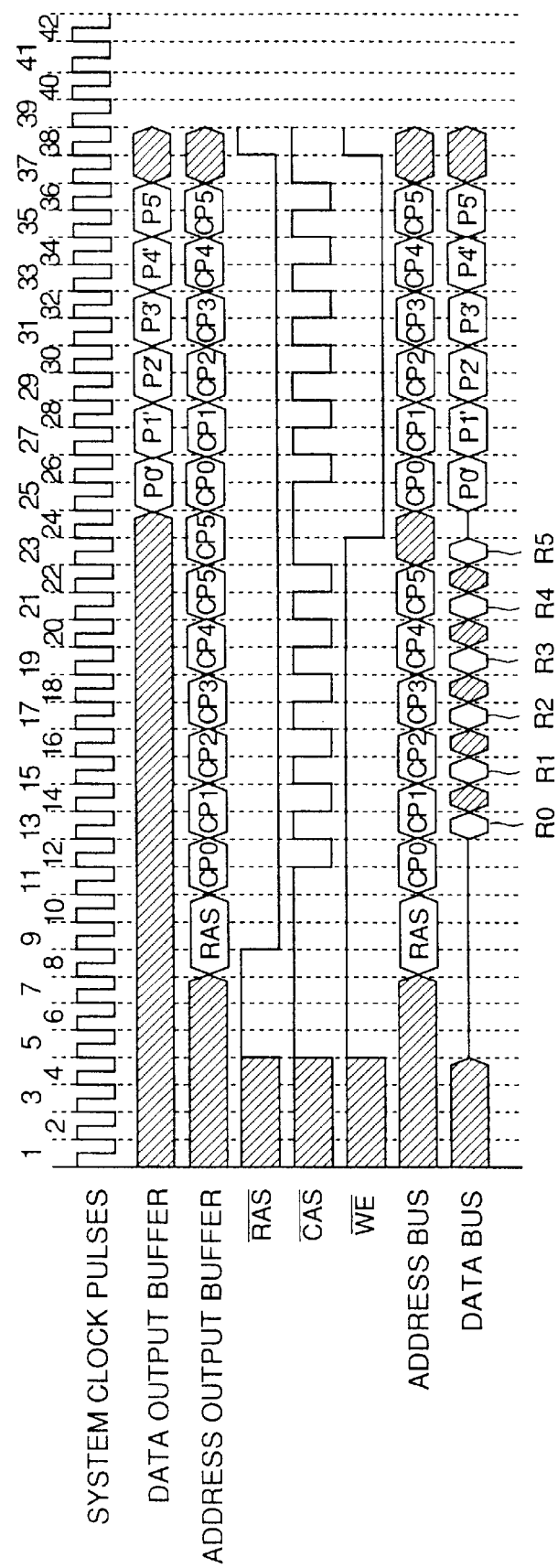
FIG. 24 shows another timing chart of the pixel buffers and the DRAM interface (the operation example 2)

During this time, as shown in FIG. 24, from the timing 9 through the timing 22, the controller 39 causes the $\overline{\text{RAS}}$ signal and the $\overline{\text{CAS}}$ signal to be active. Thereby, color data R0 through R5 at the addresses of the frame buffer 17, output from the address bus 69, is read from the frame buffer 17 in sequence. The read color data R0 through R5 is stored in the registers 46, RP*, to be used for the color calculations, as shown in FIG. 22.

Figure 22:
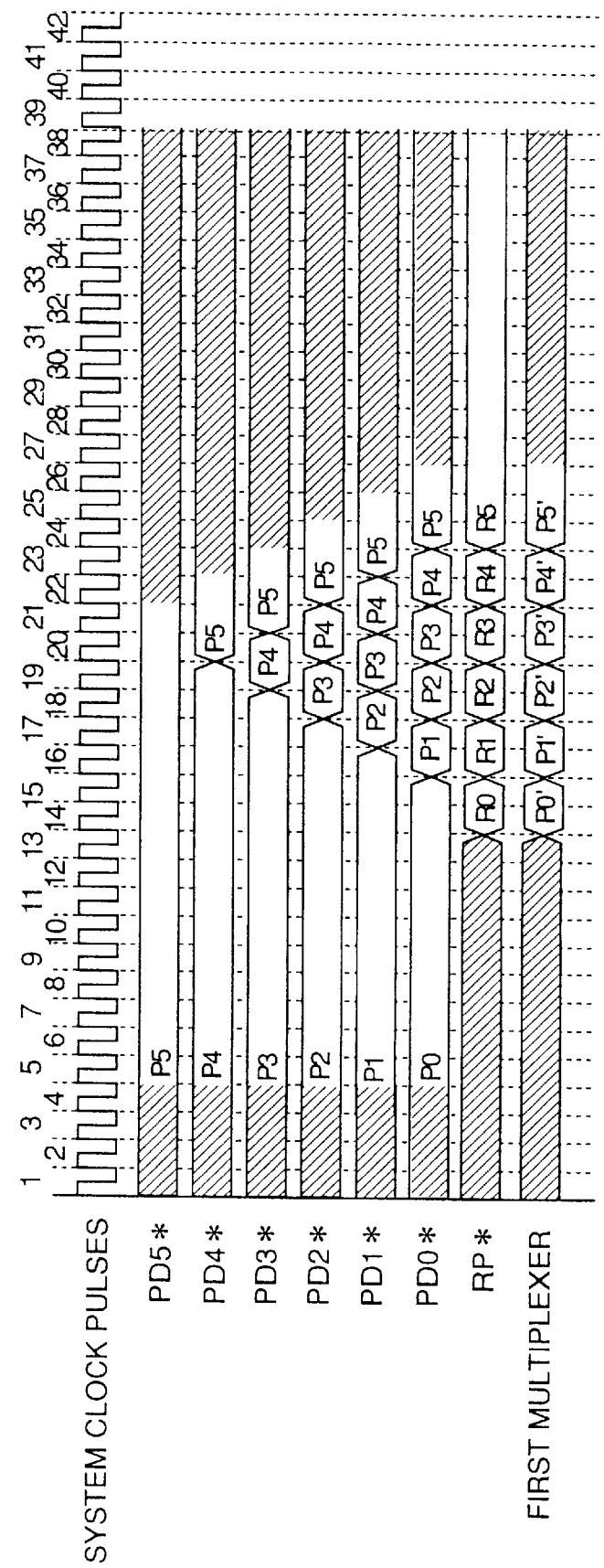
FIG. 22 shows another timing chart of the pixel buffers and the DRAM interface (the operation example 2)

As shown in FIG. 22, color data P0 through P5 is stored in the color-data buffers PD0* through PD5*, respectively, and is shifted from the 5th-stage color-data buffer through 0th-stage color-data buffer in sequence. Thereby, the 0th-stage color-data buffer stores the color data P0 through P5 in sequence. the color calculating circuits 41 perform the color calculations on the values of this color-data buffer PD0* and the values stored in the registers 46, RP*. When the access type is the type 1, the first multiplexer 45 selects the outputs of the color calculating circuits 41 and the results of the color calculations are output from the first multiplexer 45.

Figure 23:
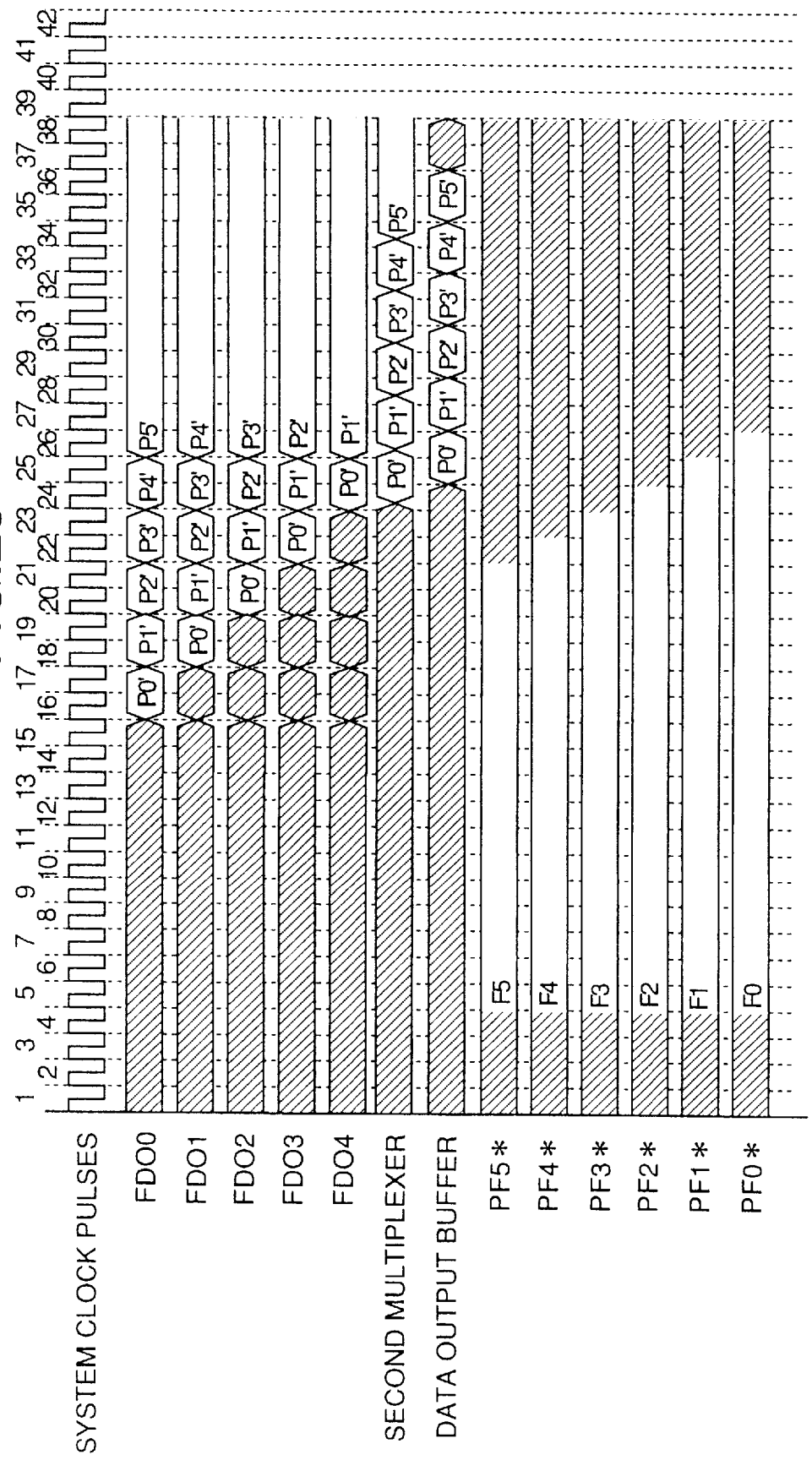
FIG. 23 shows another timing chart of the pixel buffers and the DRAM interface (the operation example 2)

Thus, as shown in FIG. 22, the color calculating circuits 41 perform the color calculations on the values R0 through R5 of the registers 46, RP*, and the values P0 through P5 of the color-data buffers PD0* in sequence. The color calculation results P0' through P5' are output to the first multiplexer 45. Further, as shown in FIG. 23, the color calculation results P0' through P5' are stored in the registers FDO0 through FD04 via the first multiplexer 45 in sequence. The second multiplexer 47 selects an appropriate one of the outputs of the FDO0 through FD04. Thereby, as shown in FIGS. 23 and 24, the data is output to the data bus 19 via the data output buffer 49. Further, during this time, the fourth multiplexer 63 selects an appropriate one of the outputs of the registers FCAD0 through FCAD5. Thereby, as shown in FIG. 21, the addresses are output from the address output buffer 65. The controller 39 controls the $\overline{\text{WE}}$ lines, $\overline{\text{RAS}}$ lines and $\overline{\text{CAS}}$ lines from the timing 24 through the timing 37 so that it is possible that the color data is written in the frame buffer 17. The $\overline{\text{CAS}}$ line control procedure in the case where the access type is the type 1 will now be described.

When the access type is the type 1, the read/write control portion 85 of the controller 39 determines the access type of the data which has been processed in the previous page mode operation. Thus, the read/write control portion 85 determines how the Z value for the same dot has been processed. When the previous access type is the type 0 (Z-buffer method), the read/write control portion 85 controls the $\overline{\text{CAS}}$ lines 25, similar to the above-described case of the type 0, with reference to the polygon flags of the buffers PF0* through PF5* and the values of the Z-value comparison results. When the previous access type is not the type 0, the read/write control portion 85 refers to the polygon flags of the buffers PF0* through PF5*. Then, when the data is polygon data, the read/write control portion 85 writes the new color data in the frame buffer 17. When the data is not polygon data, the read/write control portion 85 does not write the new color data in the frame buffer 17.

Thus, in the operation example 2, the number of times of $\overline{\text{CAS}}$ in the page mode is six, the access type is set to be the type 1, and data writing in the frame buffer 17 is performed.

2-3-3. Operation Example 3

In the operation example 3, it is assumed that, when the data is stored in the 0th-stage pixel buffer 31, the row addresses of the color data, the row addresses of the Z values and the polygon types of the data indicated by the polygon-type flags of the pixel data stored in the respective stages of pixel buffers 31 are all equal among the respective stages of pixel buffers 31, and, further, the alpha-blending flags of the polygon-type flags of the pixel data stored in the respective stages of pixel buffers 31 are all OFF.

In the operation example 3, similar to the case of the operation example 1, the row addresses of the color data and the row addresses of the Z values stored in the registers for all the stages are equal among the stages, and also, the polygon types stored in the registers for all the stages are equal among the stages. Accordingly, the number of times of CAS in the page mode is six. Further, the controller 39 examines, at the timing 6, the alpha-blending flags of the pixel data. Because the alpha-blending flags are all OFF, the access type is set to be the type 2.

In the type 2, the color data stored in the pixel buffers 31 is written in the frame buffer 17 as it is. The operations will be described with reference to timing charts shown in FIGS. 25 through 27.

Figure 25:
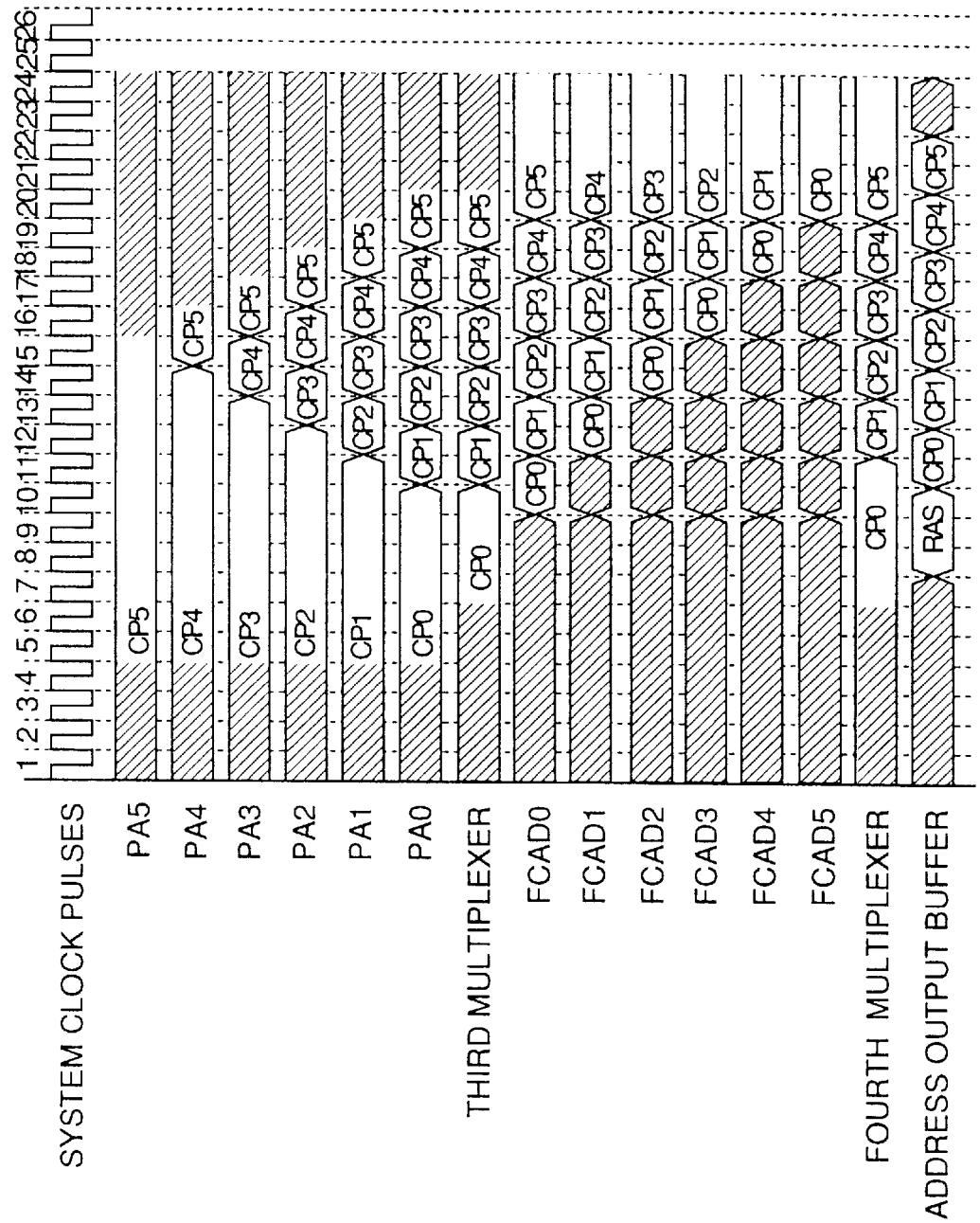
FIG. 25 shows a timing chart of the pixel buffers and the DRAM interface (the operation example 3)

As shown in FIG. 25, when address values CP5 through CP0 are stored in the color-data-address buffers PA5 through PA0, respectively, the addresses are shifted from the color-data-address buffer PA5 through the color-data-address buffer PA0 in sequence. In the type 2, the third multiplexer 61 selects the output from the color-data-address buffer PA0. Thereby, the addresses are shifted from the register FCAD0 through the register FCAD5 in sequence via the third multiplexer 61. The fourth multiplexer 63 selects an appropriate one of the outputs of the FCAD0 through FCAD5. Thereby, as shown in FIG. 25, the output of the fourth multiplexer 63 changes in sequence. During this time, from the timing 8 through the timing 22, the row address RAS and the column addresses CP0 through CP5 are output to the address output buffer 65 in sequence.

Figure 26:
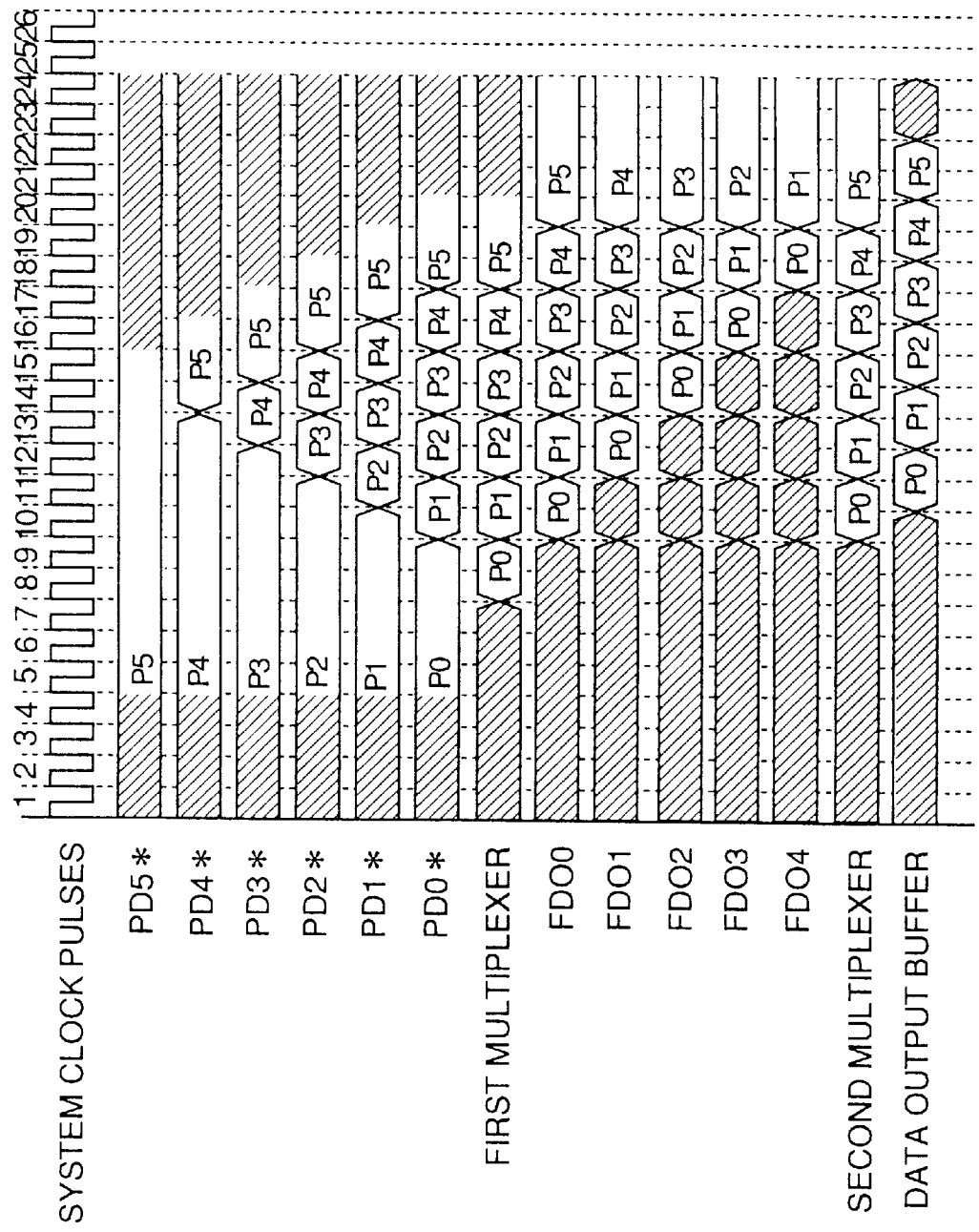
FIG. 26 shows another timing chart of the pixel buffers and the DRAM interface (the operation example 3)

The color-data buffers PD0* through PD5* store the color data P0 through P5, respectively, as shown in FIG. 26. Similar to the above-described case, the data is shifted from the 5th-stage color-data buffer PD5* through the 0th-stage color-data buffer PD0*.

Figure 27:
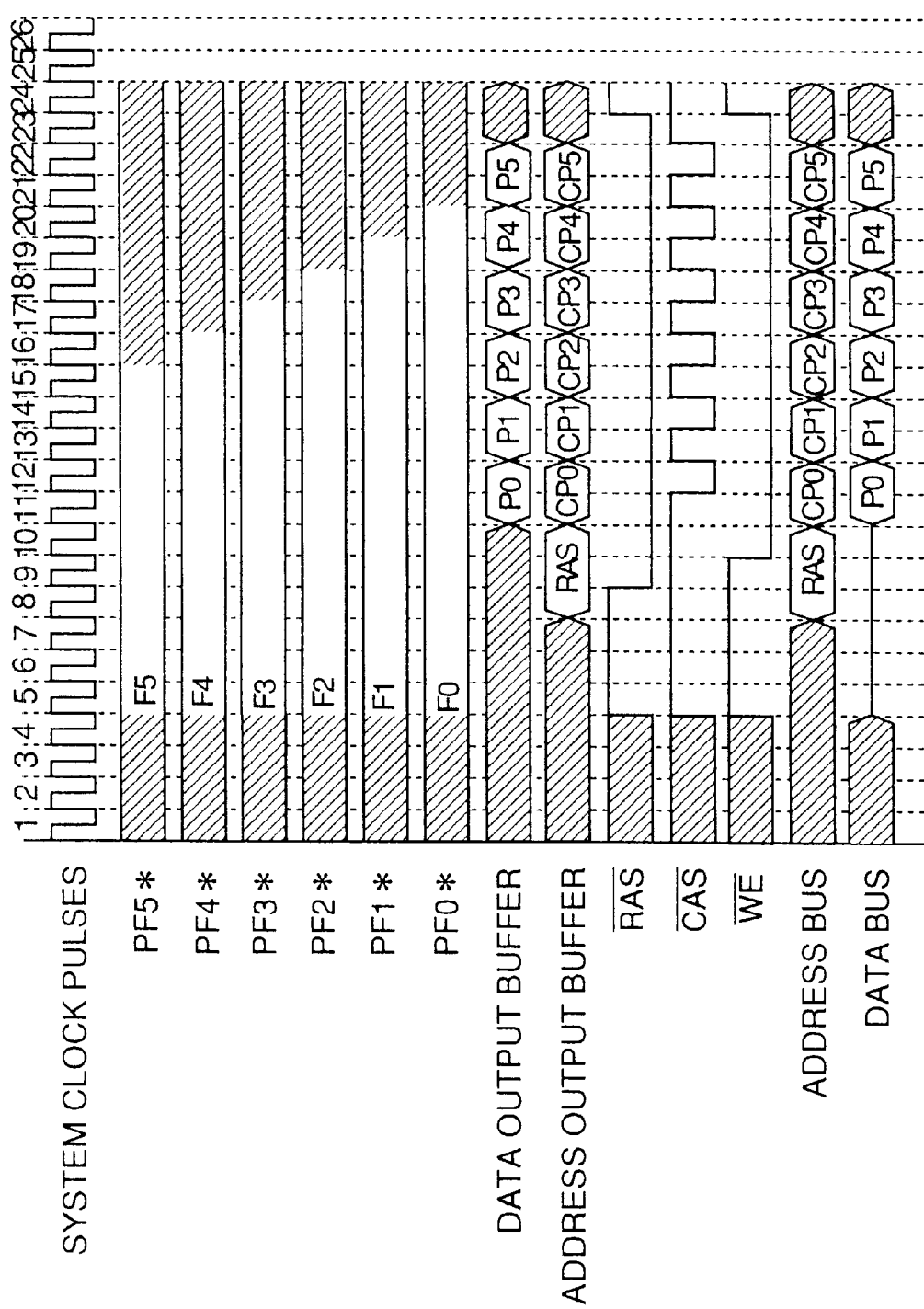
FIG. 27 shows another timing chart of the pixel buffers and the DRAM interface (the operation example 3)

When the access type is the type 2, the first multiplexer 45 selects the output of the color calculating circuits 41. However, in the operation of the type 2, the color calculation is not performed. Accordingly, the outputs of the PD0* are output to the first multiplexer 45 as they are. Similar to the above-described case, the values are stored in the registers FDO0 through FD04 in sequence. The second multiplexer 47 selects an appropriate one of the outputs of the registers FDO0 through FD04. Thereby, as shown in FIG. 27, the color data P0 through P5 is output to the data bus 19 via the data output buffer 49. The controller 39 controls, from the timing 9 through the timing 23, the $\overline{\text{RAS}}$ signal, the $\overline{\text{WE}}$ signal and the $\overline{\text{CAS}}$ signal as shown in FIG. 27. Thereby, the color data P0 through P5 is written in the frame buffer 17.

At this time, similar to the above-described case where the access type is the type 1, color-data writing determination is performed. Specifically, the controller 39 determines the access type of the previously processed data. When the previous access type is the type 0 (Z-buffer method), similar to the abovedescribed case where the access type is the type 0, the controller 39 controls the $\overline{\text{CAS}}$ lines with reference to the polygon flags and Z-value comparison results. When the previous access type is not the type 0 (Z-buffer method), the controller 39 refers to the polygon flags of the PF0* through PF5*. Then, when there is polygon data, writing of the new color data in the frame buffer 17 is performed for the polygon data.

Thus, in the operation example 3, the number of times of CAS in the page mode is six, the access type is set to be the type 2, and data writing in the frame buffer 17 is performed.

In the above-described operation examples 1 through 3, in the above-described data processing, the controller 39 performs access-type determination at the rising edge of the clock pulse of the timing 6. The controller 39 performs access-type determination at the rising edge of the clock pulse on or after the timing 39 and at the timing at which the pixel data is stored in the 0th-stage buffer.

2-3-4. Operation Example 4

In the operation example 4, it is assumed that, when the data is stored in the 0th-stage pixel buffer 31, at least one of the row addresses of the color data, the row addresses of the Z values and the polygon-type flag stored in the 0th-stage pixel buffer 31 is different from the corresponding one of those stored in the 1st-stage pixel buffer 31, or although data is stored in the 0th-stage pixel buffer 31, no data is stored in the 1st-stage pixel buffer 31. Further, the Z-buffer flag of the polygon-type flag stored in the 0th-stage pixel buffer 31 is ON.

As described above, in the operation example 4, the row addresses of the color data and the row addresses of the Z values and the polygon-type flags stored in the 0th-stage pixel buffer 31 and the 1st-stage pixel buffer 31 are completely equal between the 0th-stage and 1st-stage pixel buffers 31. Accordingly, the number of times of CAS in the page mode is one. Further, because the Z-buffer flag of the pixel data of the 0th-stage pixel buffer 31 is ON, the access type is set to be the type 0.

Figure 28:
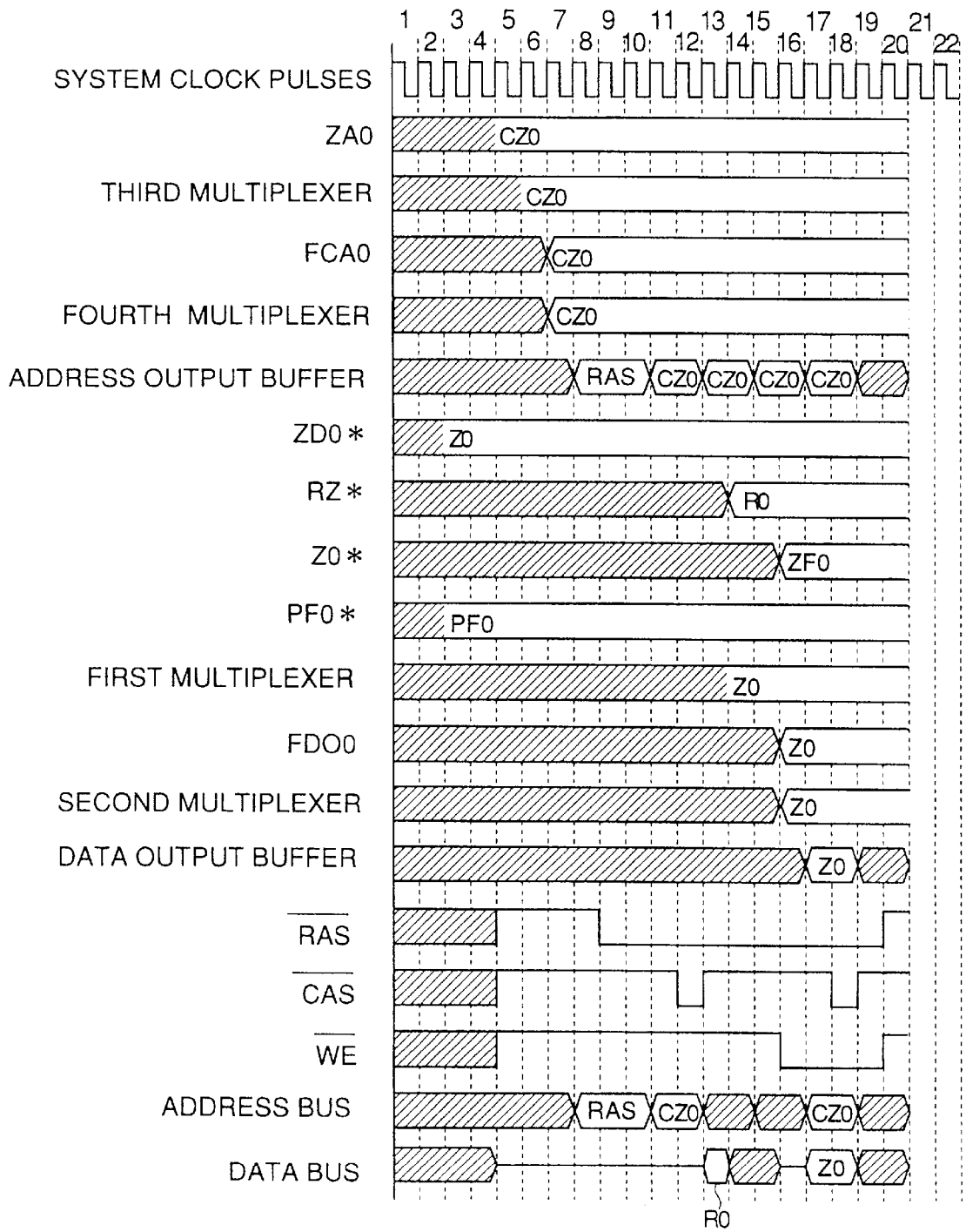
FIG. 28 shows a timing chart of the pixel buffers and the DRAM interface (the operation example 4)

FIG. 28 shows a timing chart in this case (in the type 0). In the figure, when data is stored in the 0th-stage pixel buffer 31, a value CZ0 of the Z-value address is output to the address output buffer 65 via the third multiplexer 61, the register FCAD0 and the fourth multiplexer 63. When the $\overline{CAS}$ line is caused to be active at the timing 12, the Z values R0 are read from the frame buffer 17 based on this address. The read data is stored in the register 48, RZ*, at the timing 14. The values R0 stored in the Z-value register RZ* are compared with the values Z0 stored in the Z-value buffer ZD0*, respectively. The comparison results ZF0 are stored in the comparison-result registers Z0* at the timing 16. Then, via the first multiplexer 45, the Z-value data Z0 is output to the register FDO0 and the second multiplexer 47. At the timing 17, the data Z0 is output to the data output buffer 49. Thus, at the timing 17, the Z-value data Z0 is output to the data bus 19 and the address CZ0 therefor is output to the address bus 69. Then, the Z-value comparison results and the polygon flags are referred to, and, similar to the case of the operation example 1, it is determined whether or not the $\overline{CAS}$ lines 25 are to be active. In the example of FIG. 28, it is assumed that the positions represented by the Z values Z0 of the pixel data currently being processed are displayed nearer to the viewer than the positions represented by the Z values R0 of the previous pixel data. Therefore, in order to change the data of the frame buffer 17 to the new Z values Z0, the $\overline{CAS}$ lines 25 are caused to be active at the timing 18.

2-3-5. Operation Example 5

The conditions of the operation example 5 are the same as those of the operation example 4 except that the alpha blending flag of the pixel data stored in the 0th-stage pixel buffer 31 is ON in the operation example 5. Therefore, similar to the case of the operation example 4, the number of times of CAS in the page mode is one. Because the alpha blending flag is ON, the access type is set to be the type 1.

Figure 29:
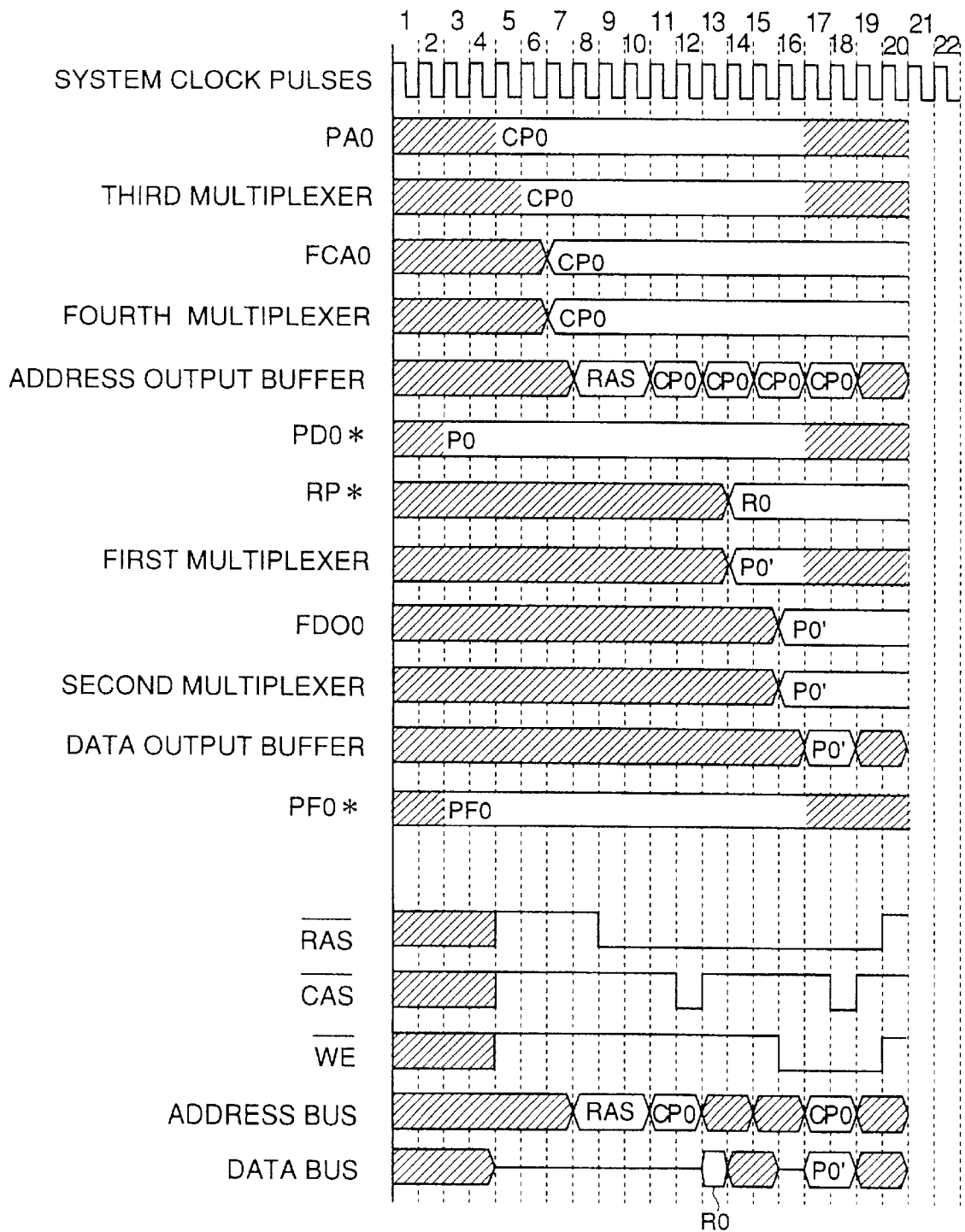
FIG. 29 shows a timing chart of the pixel buffers and the DRAM interface (the operation example 5)

With reference to FIG. 29, when data is stored in the 0th-stage pixel buffer 31, a color-data address value CP0 is output to the address output buffer 65 via the third multiplexer 61, the register FCAD0 and the fourth multiplexer 63. When the $\overline{CAS}$ lines 25 are caused to be active at the timing 12, the color data is read from the frame buffer 17 based on this address. At the timing 14, the read data R0 is stored in the color-data register 46, RP*. The color calculation is performed on the values R0 stored in the color-data register 46, RP*, and the values P0 stored in the color-data buffer PD0*. Via the first multiplexer 45, the color-calculation results P0' are output to the register FDO0 and the second multiplexer 47, and, at the timing 17, the data P0' is output to the data output buffer 49. Thus, at the timing 17, the data P0' is output to the data bus 19 and the address CP0 therefor is output to the address bus 69. Then, similar to the case of the operation example 2, the access type, polygon type and so forth, with which data is processed in the previous page mode operation, are referred to, it is determined whether or not the $\overline{CAS}$ lines 25 are to be active, and data writing in the frame buffer 17 is performed.

2-3-6. Operation Example 6

The conditions of the operation example 6 are the same as those of the operation example 4 except that the alpha blending flag of the pixel data stored in the 0th-stage pixel buffer 31 is OFF in the operation example 6. Therefore, similar to the case of the operation example 4, the number of times of CAS in the page mode is one. Because the alpha blending flag is OFF, the access type is set to be the type 2.

Figure 30:
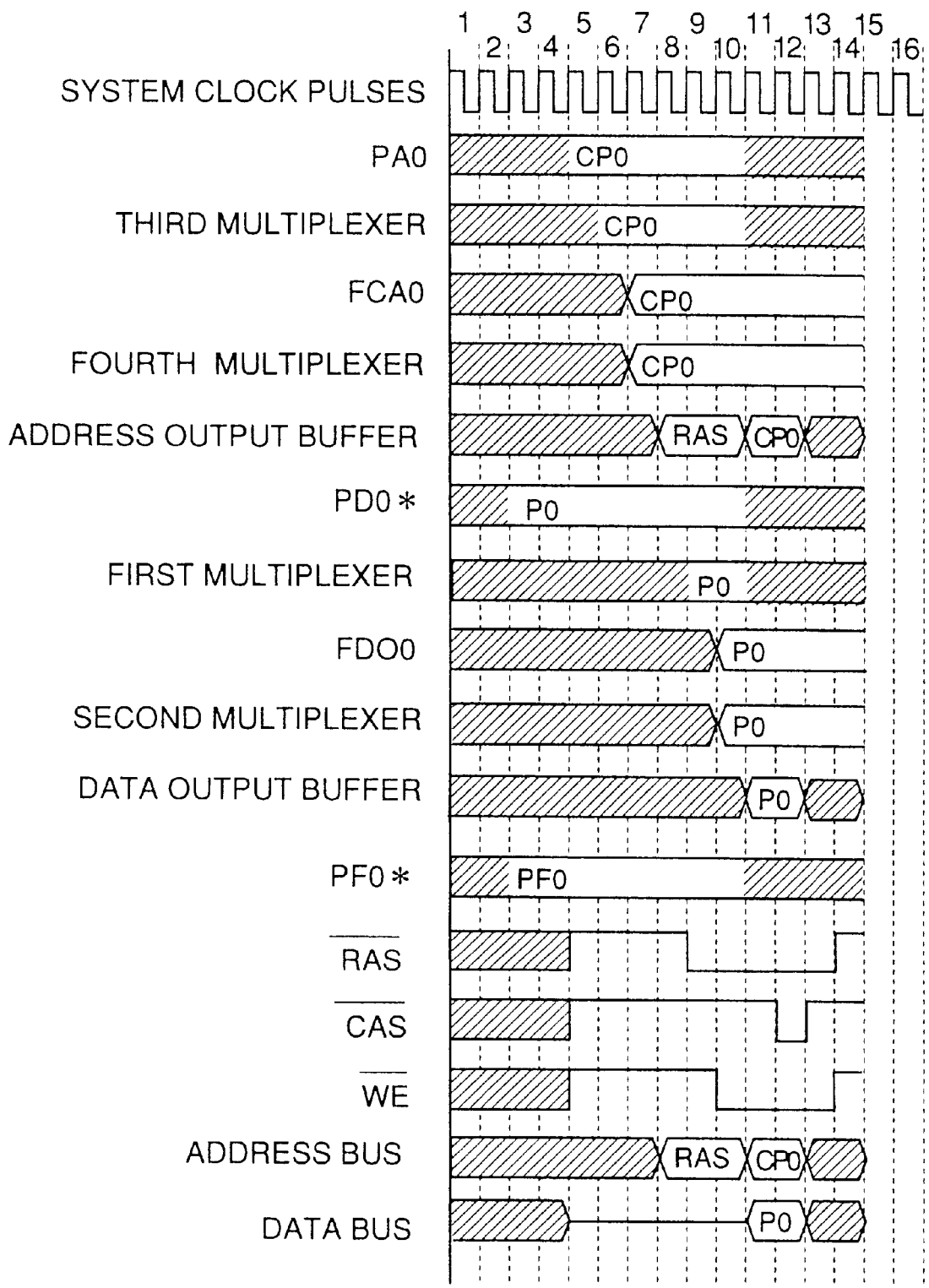
FIG. 30 shows a timing chart of the pixel buffers and the DRAM interface (the operation example 6)

FIG. 30 shows a timing chart in this case (in the type 2). In the figure, when data is stored in the 0th-stage pixel buffer 31, a color-data address value CP0 is output to the address output buffer 65 via the third multiplexer 61, the register FCAD0 and the fourth multiplexer 63. Further, data P0 stored in the color-data buffer PD0* is output to the first multiplexer 45, the register FDO0, the second multiplexer 47 and the data output buffer 49. Thus, the data P0 is output to the data bus 19 and the address CP0 therefor is output to the address bus 69. Then, similar to the case of the operation example 5, the access type, polygon type and so forth, with which data is processed in the previous page mode operation, are referred to, it is determined, as described above, whether or not the $\overline{CAS}$ lines 25 are to be active, and data writing in the frame buffer 17 is performed.

3. Advantages

Thus, in the image processing apparatus in the first embodiment, when the number of times of CAS in the page mode is one, similar to the case where the number of times of $\overline{CAS}$ in the page mode is six, processing of the pixel data to the frame buffer 17 can be performed. In the case of FIG. 27, the controller 39 performs access-type determination at the rising edge of the clock pulse of the timing 6, and performs access-type determination at the rising edge of the clock pulse on or after the timing 25 and at the timing at which the pixel data is stored in the 0th-stage buffer.

Thus, in the image processing apparatus in the first embodiment, it is determined, from the row addresses and polygon types of a plurality of pixel data, whether or not the plurality of pixel data can be processed successively, and the number of pixel data which can be processed successively is determined. Based on this number, the number of times of CAS (successively caused to be active) in the page mode when data is written in the frame buffer 17 is controlled. Thereby, the number of accesses can be determined in accordance with the contents of data, and useless accesses can be eliminated. As a result, data processing time can be reduced. Further, some access types are set for performing Z-value comparisons, color calculations and so forth in accordance with a type of polygon data which is processed. By combining these access types and processing polygons, a Z-buffer method, an alpha blending operation and so forth can be performed.

4. Second Embodiment

Figure 31:
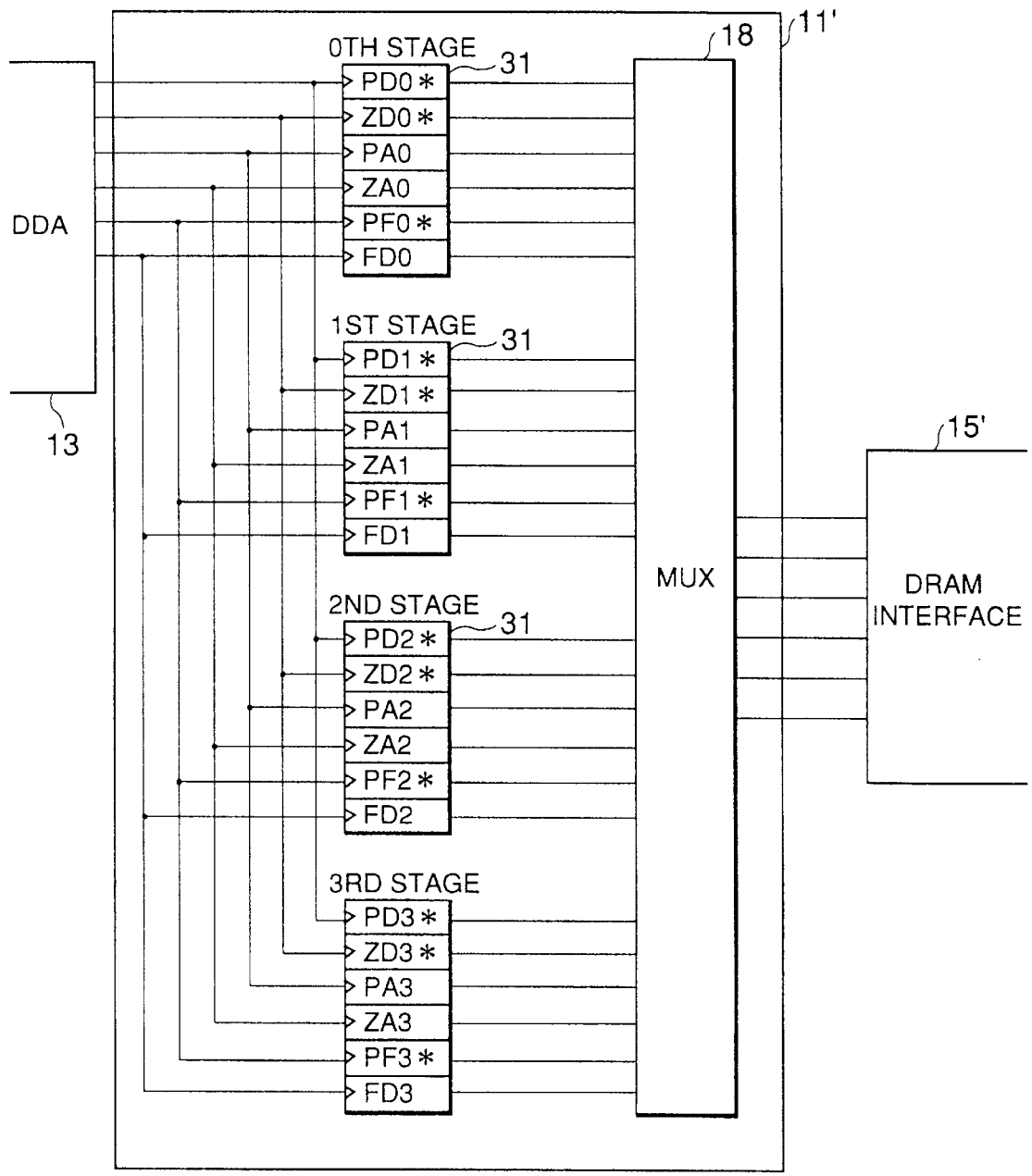
FIG. 31 shows a block diagram of a pixel buffer portion in a second embodiment of the present invention.

FIG. 31 shows a block diagram of a pixel buffer portion in a second embodiment of the present invention. The second embodiment is similar to the first embodiment. The same reference numerals are given to the portions/parts/components which are the same as those of the first embodiment. Only the different points will be described. In contrast to the first embodiment in which the six pixel buffers 31 in the pixel buffer portion 11 are connected in series as shown in FIG. 9, four pixel buffers 31 in the pixel buffer portion 11' are connected in parallel as shown in FIG. 31. The pixel data is input first to the 0th-stage pixel buffer 31, then to the first-stage pixel buffer 31, then to the second-stage pixel buffer 31 and then to the fourth-stage pixel buffer 31. This is because the controller 39' controls whether or not each pixel buffer 31 receive the pixel data. A multiplexer 18 controls output of the pixel data stored in the four stages of pixel buffers 31.

Figure 32:
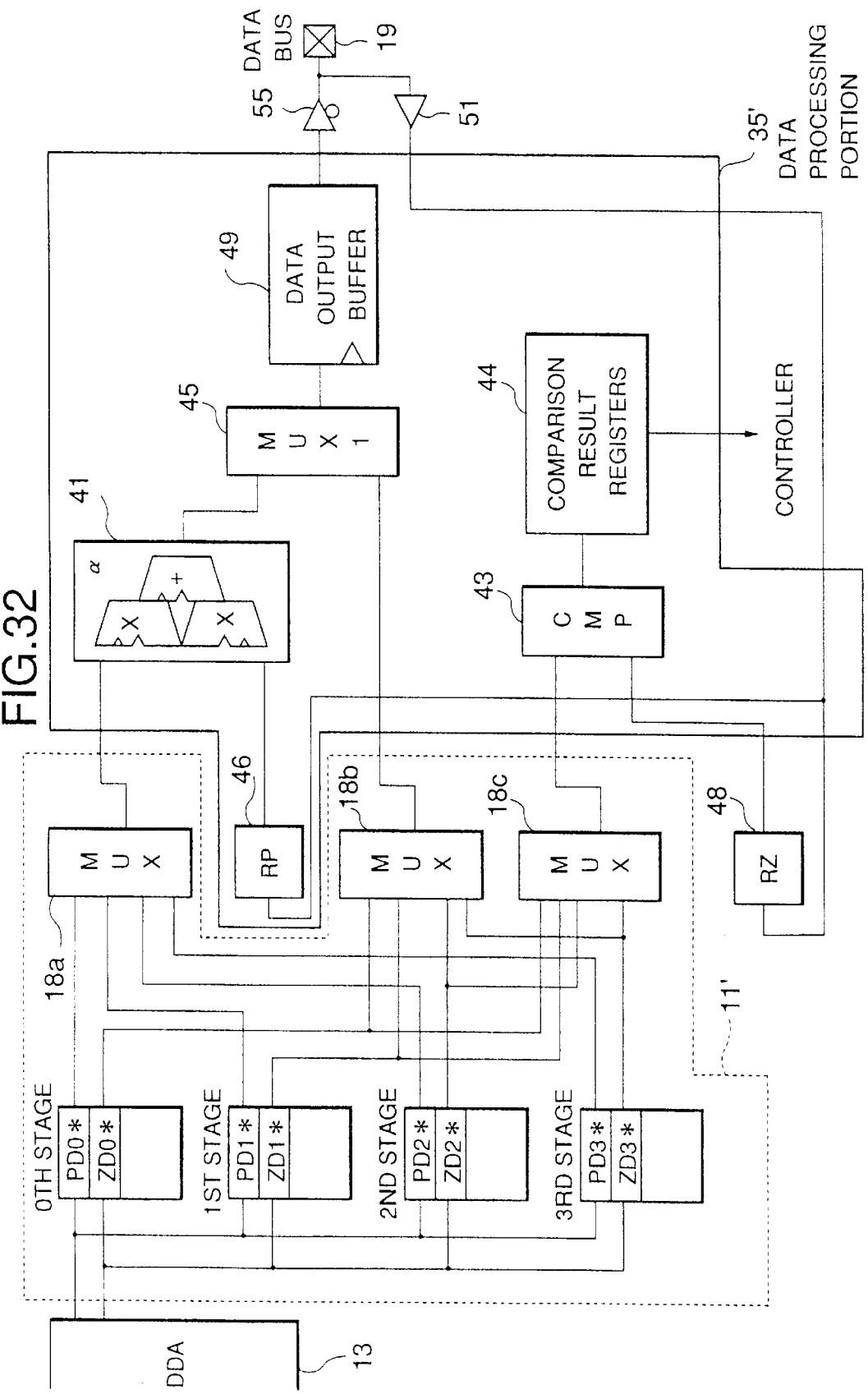
FIG. 32 shows a block diagram of a data processing portion 35' and a portion of the pixel buffer portion 11', which portion relates to color data and Z values, in the second embodiment of the present invention.

FIG. 32 shows a block diagram of a data processing portion 35' and a portion of the pixel buffer portion 11', which portion relates to the color data PD and Z values ZD. The multiplexer 18a selects and outputs, to the color calculating circuits 41, the color data of the 0th-stage pixel buffer 31, then the color data of the first-stage pixel buffer 31, then the color data of the second-stage pixel buffer 31 and then the color data of the third-stage pixel buffer 31. At the same time, the corresponding color data read from the frame buffer 17 and stored in the registers 46 are output to the color calculating circuits 41. The color calculating circuits 41 perform the color calculation on this color data in the same manner as that in the case of the first embodiment. The color calculating circuits 41 perform the color calculation operation in a pipe-line manner. By controlling the calculation progress in the color calculating circuits 41, the controller 39' controls the output of the color data as the result of the color data calculation. Thereby, the color data as the result of the color data calculation is output one by one in sequence with a predetermined timing. As a result, registers such as the registers FDO0, FD01, FD02, FD03, FD04 and the multiplexer 47 can be eliminated with regard to the output of the color calculation results.

With regard to the Z-value comparison operations, in contrast to the case of the first embodiment, the Z values are still stored in the four stages of pixel buffers 31 after the Z value comparison operations using the Z values supplied from the pixel buffers via the multiplexer 18c and the Z values supplied from the registers 48 read from the frame buffer 17. The output of these Z values from the pixel buffers 31 is performed via the multiplexer 18b and thus is controlled by the controller 39'. Thereby, the Z values are output one by one in sequence with a predetermined timing. As a result, registers such as the registers FDO0, FD01, FD02, FD03, FD04 and the multiplexer 47 can be eliminated also with regard to the output of the Z values.

Figure 33:
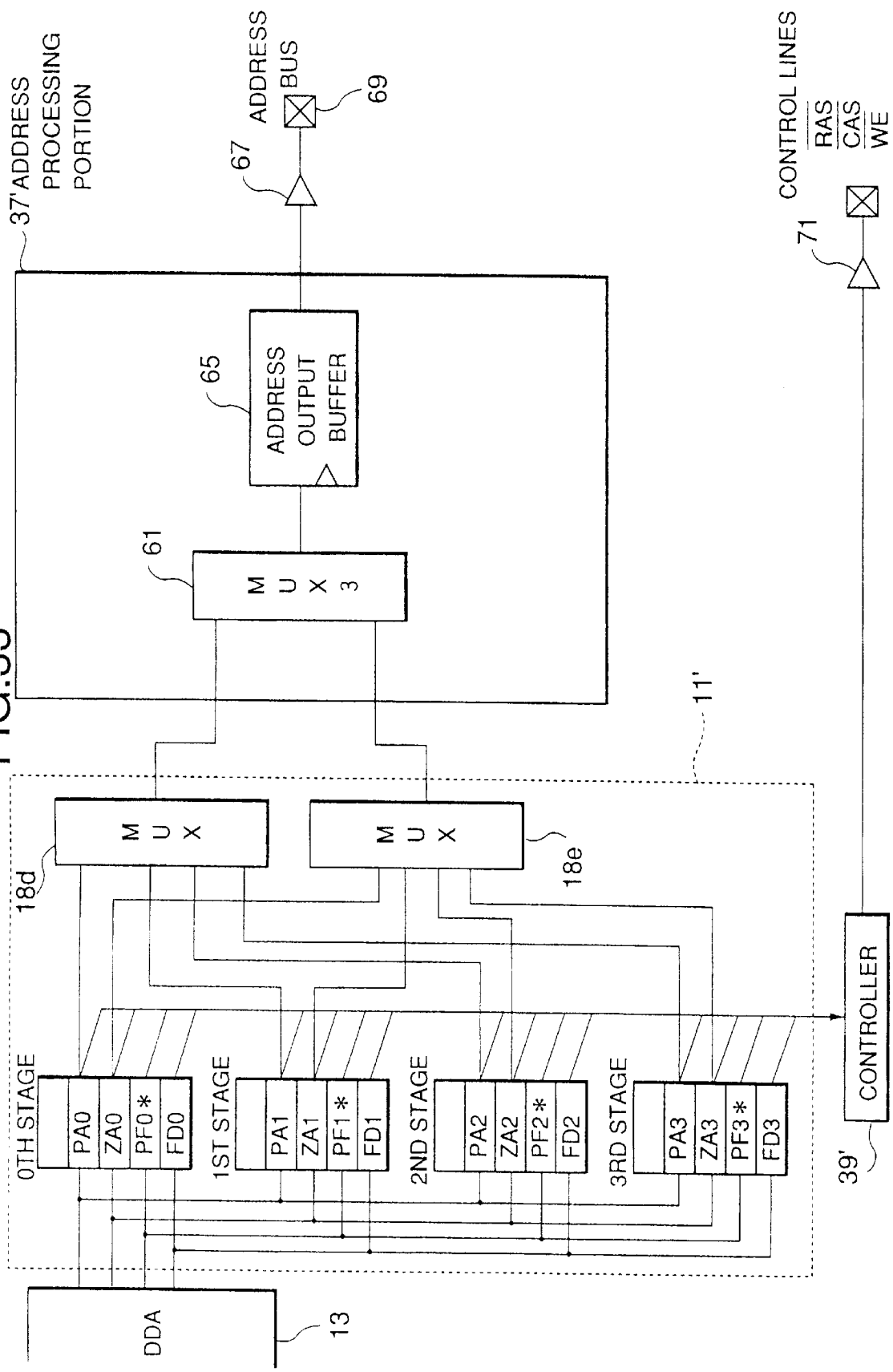
FIG. 33 shows a block diagram of an address processing portion 35' and a portion of the pixel buffer portion 11', which portion relates to color-data addresses, Z-value addresses, polygon flags and polygon-type flags, in the second embodiment of the present invention.

FIG. 33 shows a block diagram of an address processing portion 37' and a portion of the pixel buffer portion 11', which portion relates to the color-data addresses PA, the Z-value addresses ZA, the polygon flags PF and the polygon-type flags FD. With regard to the color-data address PA, the Z-value address ZA, the polygon flags PF and the polygon-type flags FD, the data is supplied to the controller in the same manner as that in the case of the first embodiment. With regard to the color-data addresses PA and the Z-value addresses ZA, output of the data is performed via the multiplexers 18d and 18e and thus is controlled by the controller 39'. As a result, registers such as the registers FCAD0, FCAD1, FCAD2, FCAD3, FCAD4 and FCAD5, and the multiplexer 63 can be eliminated.

The term 'stage' described here for the second embodiment is merely used for the sake of convenience. Actually, the 0th-stage pixel buffer 31, the first-stage pixel buffer 31, the second-stage pixel buffer 31 and the third-stage pixel buffer 31 are used in a cyclic manner, as follows: the 0th-stage pixel buffer 31→ the first-stage pixel buffer 31→ the second-stage pixel buffer 31→ the third-stage pixel buffer 31→ the 0th-stage pixel buffer 31→ the first-stage pixel buffer 31→ the second-stage pixel buffer 31→ the third-stage pixel buffer 31→ the 0th-stage pixel buffer 31→. . . Accordingly, the 0th-stage pixel buffer 31 is not always used first.

Further, the present invention is not limited to the above-described embodiments, and variations and modifications may be made without departing from the scope of the present invention.

What is claimed is:

1. An image processing apparatus for reading and writing pixel data representative of a predetermined number of pixels via one access to a frame buffer which stores the pixel data, said frame buffer having a memory to which access in a page mode is performed, said apparatus comprising:

pixel buffer means having a plurality of stages of pixel buffers, each of said stages storing the pixel data representative of the predetermined number of pixels; and memory interface means for determining a number of blocks of the pixel data which is to be processed successively, based on the pixel data stored in each of said stages, and determining a number of CAS signals representing a number of accesses at the same row address in one page mode operation for writing the pixel data in said frame buffer.

2. The image processing apparatus according to claim 1, wherein:

the pixel data is data of a three-dimensional image, the pixel data includes color data, a Z value indicating a depth, an address of the color data, an address of the Z value, information indicating whether or not the pixel data is polygon data and information indicating a polygon type of the pixel data; and said memory interface means compares the row address and polygon type of the pixel data stored in one of said plurality of stages of pixel buffers with the row addresses and polygon types of the pixel data stored in the subsequent-stage pixel buffers, and, based on the number of stages of pixel buffers which are continuous from said one of said plurality of stages of pixel buffers and, among which, the row addresses and polygon types of the pixel data are equal, determines the number of times of CAS.

3. The image processing apparatus according to claim 2, wherein said memory interface means, based on the information indicating the polygon type of the pixel data, determines an access type in which the data is processed, and performs predetermined polygon processing based on the access type.

4. The image processing apparatus according to claim 3, wherein the access type can be a type in which the Z value stored in at least one of said plurality of stages of pixel buffers is compared with the Z value stored in said frame buffer, for the same dot, and, when the Z value stored in said at least one of said plurality of stages of pixel buffers indicates a position nearer to a viewer than the position indicated by the Z value stored in said frame buffer, the Z value stored in said at least one of said plurality of stages of pixel buffers is overwritten in said frame buffer for the dot.

5. The image processing apparatus according to claim 3, wherein the access type can be a type in which color calculation is performed on the color data of the pixel data stored in at least one of said plurality of stages of pixel buffers and the color data stored in said frame buffer for the same dot, and the color data which is the color calculation result is overwritten in said frame buffer for the dot.

6. The image processing apparatus according to claim 3, wherein the access type can be a type in which the color data of the pixel data stored in at least one of said plurality of stages of pixel buffers is overwritten in said frame buffer.

7. An image processing apparatus for reading and writing pixel data representative of a predetermined number of pixels via one access to a frame buffer which stores the pixel data, said frame buffer having a memory to which access in a page mode is performed, said apparatus comprising:

a pixel buffer portion having a plurality of stages of pixel buffers, each of said stages storing the pixel data representative of the predetermined number of pixels; and a memory interface is connected to said pixel buffer portion for determining a number of blocks of the pixel data which is to be processed successively, based on the pixel data stored in each of said stages, and determining a number of CAS signals representing a number of accesses at the same row address in one page mode operation for writing the pixel data in said frame buffer.

8. The image processing apparatus according to claim 7, wherein said memory interface comprises:

a data processing portion which performs a color calculation on the color data stored in at least one of said plurality of stages of pixel buffers and the color data stored in said frame buffer for the same dot, the color data which is the color calculation result being overwritten in said frame buffer for the dot, and compares the Z value of the pixel data stored in said at least one of said plurality of stages of pixel buffers and the Z value stored in said frame buffer for the same dot, and, when the Z value stored in said at least one of said plurality of stages of pixel buffers indicates the position nearer to a viewer than the position indicated by the Z value stored in said frame buffer, the Z value stored in said at least one of said plurality of stages of pixel buffers is overwritten in said frame buffer for the dot;

an address processing portion which controls output of addresses of said frame buffer for reading data from said frame buffer and writing data in said frame buffer; and a controller which controls the operations of said data processing portion and said address processing portion.

* * * * *